United States Patent
May et al.

(10) Patent No.: US 7,479,622 B2
(45) Date of Patent: *Jan. 20, 2009

(54) INTEGRATING CHAMBER CONE LIGHT USING LED SOURCES

(75) Inventors: Donald F. May, Vienna, VA (US); Jack C. Rains, Jr., Herndon, VA (US)

(73) Assignee: Advanced Optical Technologies, LLC, Herndon, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/589,942

(22) Filed: Oct. 31, 2006

(65) Prior Publication Data

US 2007/0045523 A1 Mar. 1, 2007

Related U.S. Application Data

(63) Continuation of application No. 10/601,101, filed on Jun. 23, 2003, now Pat. No. 7,145,125.

(51) Int. Cl.
*F21V 9/00* (2006.01)
*F21V 11/00* (2006.01)

(52) U.S. Cl. .................. 250/205; 362/231; 362/235

(58) Field of Classification Search .......... 250/228, 250/205; 362/231, 236, 241, 4, 5; 315/134, 315/149, 312

See application file for complete search history.

(56) References Cited

U.S. PATENT DOCUMENTS 3,780,357 A 12/1973 Haitz (Continued)

FOREIGN PATENT DOCUMENTS

| EP | 1 176 849 A2 | 1/2002 |
|---|---|---|
| JP | 8-180978 | 7/1996 |
| WO | WO 00/19141 | 4/2000 |

(Continued)

OTHER PUBLICATIONS

"Developmental Product Technical Data Bulletin" Ferro Corporation- Specialty Plastics Group, Filled and Reinforced Plastics Division, Evansville, IN.

(Continued)

*Primary Examiner*—Stephen Yam
(74) *Attorney, Agent, or Firm*—McDermott Will & Emery LLP

(57) ABSTRACT

A system to provide radiant energy of selectable spectral characteristic (e.g. a selectable color combination) uses an integrating cavity to combine energy of different wavelengths from different sources. The cavity has a diffusely reflective interior surface and an aperture for allowing emission of combined radiant energy. Sources of radiant energy of different wavelengths, typically different-color LEDs, supply radiant energy into the interior of the integrating cavity. In the examples, the points of entry of the energy into the cavity typically are located so that they are not directly visible through the aperture. The cavity effectively integrates the energy of different wavelengths, so that the combined radiant energy emitted through the aperture includes the radiant energy of the various wavelengths. The apparatus also includes a control circuit coupled to the sources for establishing output intensity of radiant energy of each of the sources. Control of the intensity of emission of the sources sets the amount of each wavelength of energy in the combined output and thus determines a spectral characteristic of the radiant energy output through the aperture.

39 Claims, 8 Drawing Sheets

U.S. PATENT DOCUMENTS

| | | | |
|---|---|---|---|
| 4,677,533 | A | 6/1987 | McDermott et al. |
| 4,962,687 | A | 10/1990 | Belliveau et al. |
| 4,992,704 | A | 2/1991 | Stinson |
| 5,241,459 | A | 8/1993 | Kaplan et al. |
| 5,365,084 | A | 11/1994 | Cochran et al. |
| 5,400,228 | A | 3/1995 | Kao |
| 5,420,482 | A | 5/1995 | Phares |
| 5,471,052 | A | 11/1995 | Ryczek |
| 5,608,213 | A | 3/1997 | Pinkus et al. |
| 5,650,843 | A | 7/1997 | Moberg et al. |
| 5,752,766 | A | 5/1998 | Bailey et al. |
| 5,838,247 | A | 11/1998 | Bladowski |
| 5,877,490 | A | 3/1999 | Ramer et al. |
| 5,899,557 | A | 5/1999 | McDermott |
| 5,914,487 | A | 6/1999 | Ramer et al. |
| 6,007,209 | A | 12/1999 | Pelka |
| 6,007,225 | A * | 12/1999 | Ramer et al. ............... 362/554 |
| 6,084,250 | A | 7/2000 | Justel et al. |
| 6,127,783 | A | 10/2000 | Pashley et al. |
| 6,139,166 | A | 10/2000 | Marshall et al. |
| 6,149,283 | A | 11/2000 | Conway et al. |
| 6,150,774 | A | 11/2000 | Mueller et al. |
| 6,166,496 | A | 12/2000 | Lys et al. |
| 6,183,086 | B1 | 2/2001 | Neubert |
| 6,184,628 | B1 | 2/2001 | Ruthenberg |
| 6,200,002 | B1 | 3/2001 | Marshall et al. |
| 6,219,140 | B1 * | 4/2001 | Kaplan ....................... 356/406 |
| 6,222,172 | B1 | 4/2001 | Fossum et al. |
| 6,222,623 | B1 | 4/2001 | Wetherell |
| 6,234,648 | B1 | 5/2001 | Borner et al. |
| 6,238,077 | B1 | 5/2001 | Ramer et al. |
| 6,257,737 | B1 | 7/2001 | Marshall et al. |
| 6,266,136 | B1 | 7/2001 | Ramer et al. |
| 6,273,589 | B1 | 8/2001 | Weber et al. |
| 6,280,054 | B1 | 8/2001 | Cassarly et al. |
| 6,286,979 | B1 | 9/2001 | Ramer et al. |
| 6,299,328 | B1 | 10/2001 | Wilson |
| 6,299,329 | B1 | 10/2001 | Mui et al. |
| 6,334,700 | B2 | 1/2002 | Ramer et al. |
| 6,340,868 | B1 | 1/2002 | Lys et al. |
| 6,342,695 | B1 | 1/2002 | Ramer et al. |
| 6,357,889 | B1 | 3/2002 | Duggal et al. |
| 6,357,893 | B1 | 3/2002 | Belliveau |
| 6,361,192 | B1 | 3/2002 | Fussell et al. |
| 6,422,718 | B1 | 7/2002 | Anderson et al. |
| 6,441,558 | B1 | 8/2002 | Muthu et al. |
| 6,459,919 | B1 | 10/2002 | Lys et al. |
| 6,488,389 | B2 | 12/2002 | Cassarly et al. |
| 6,523,977 | B2 | 2/2003 | Chuang et al. |
| 6,525,668 | B1 | 2/2003 | Petrick |
| 6,527,411 | B1 | 3/2003 | Sayers |
| 6,533,429 | B2 | 3/2003 | Yoneda |
| 6,536,914 | B2 | 3/2003 | Hoelen et al. |
| 6,547,416 | B2 | 4/2003 | Pashley et al. |
| 6,601,974 | B1 | 8/2003 | Hewlett et al. |
| 6,621,239 | B1 | 9/2003 | Belliveau |
| 6,626,558 | B2 | 9/2003 | Momot et al. |
| 6,636,003 | B2 | 10/2003 | Rahm et al. |
| 6,659,622 | B2 | 12/2003 | Katogi et al. |
| 6,692,136 | B2 | 2/2004 | Marshall et al. |
| 6,700,112 | B2 | 3/2004 | Brown |
| 6,744,223 | B2 | 6/2004 | Laflamme et al. |
| 6,759,814 | B2 | 7/2004 | Vogel et al. |
| 6,793,374 | B2 | 9/2004 | Begemann |
| 6,806,659 | B1 | 10/2004 | Mueller et al. |
| 6,836,083 | B2 | 12/2004 | Mukai |
| 6,840,652 | B1 | 1/2005 | Hymer |
| 6,854,857 | B2 | 2/2005 | Hara et al. |
| 6,869,206 | B2 | 3/2005 | Zimmerman et al. |
| 6,888,322 | B2 | 5/2005 | Dowling et al. |
| 6,897,624 | B2 | 5/2005 | Lys et al. |
| 6,936,978 | B2 | 8/2005 | Morgan et al. |
| 6,960,872 | B2 | 11/2005 | Beeson et al. |
| 6,965,205 | B2 | 11/2005 | Piepgras et al. |
| 6,967,448 | B2 | 11/2005 | Morgan et al. |
| 6,969,954 | B2 | 11/2005 | Lys |
| 6,975,079 | B2 | 12/2005 | Lys et al. |
| 6,995,355 | B2 | 2/2006 | Rains, Jr. et al. |
| 7,012,382 | B2 | 3/2006 | Cheang et al. |
| 7,014,336 | B1 | 3/2006 | Ducharme et al. |
| 7,025,464 | B2 | 4/2006 | Beeson et al. |
| 7,031,920 | B2 | 4/2006 | Dowling et al. |
| 7,038,398 | B1 | 5/2006 | Lys et al. |
| 7,038,399 | B2 | 5/2006 | Lys et al. |
| 7,040,774 | B2 | 5/2006 | Beeson et al. |
| 7,042,172 | B2 | 5/2006 | Dowling et al. |
| 7,048,385 | B2 | 5/2006 | Beeson et al. |
| 7,064,498 | B2 | 6/2006 | Dowling et al. |
| 7,108,413 | B2 | 9/2006 | Kwong et al. |
| 7,145,125 | B2 | 12/2006 | May et al. |
| 7,159,986 | B2 | 1/2007 | Bremer et al. |
| 7,220,039 | B2 | 5/2007 | Ahn et al. |
| 7,293,908 | B2 | 11/2007 | Beeson et al. |
| 7,374,311 | B2 | 5/2008 | Rains, Jr. et al. |
| 2002/0064043 | A1 | 5/2002 | Ariga et al. |
| 2002/0145708 | A1 | 10/2002 | Childers et al. |
| 2002/0191416 | A1 | 12/2002 | Wesson |
| 2003/0034985 | A1 | 2/2003 | Riddle et al. |
| 2003/0076056 | A1 | 4/2003 | Schuurmans |
| 2003/0117796 | A1 | 6/2003 | Voser |
| 2003/0193816 | A1 | 10/2003 | Rahn |
| 2003/0197113 | A1 * | 10/2003 | Pitigoi-Aron et al. ....... 250/205 |
| 2004/0105264 | A1 | 6/2004 | Spero |
| 2004/0151008 | A1 * | 8/2004 | Artsyukhovich et al. .... 362/572 |
| 2004/0156199 | A1 | 8/2004 | Rivas et al. |
| 2004/0160199 | A1 | 8/2004 | Morgan et al. |
| 2004/0188594 | A1 * | 9/2004 | Brown et al. ................ 250/205 |
| 2005/0040774 | A1 | 2/2005 | Mueller et al. |
| 2005/0062446 | A1 | 3/2005 | Ashdown |
| 2005/0063063 | A1 | 3/2005 | Ashdown |
| 2005/0156103 | A1 | 7/2005 | May et al. |
| 2005/0161586 | A1 | 7/2005 | Rains et al. |
| 2006/0001381 | A1 | 1/2006 | Robinson et al. |
| 2006/0028156 | A1 | 2/2006 | Jungwirth |

FOREIGN PATENT DOCUMENTS

| | | |
|---|---|---|
| WO | WO 02/076150 A1 | 9/2002 |
| WO | WO 03/069219 A1 | 8/2003 |

OTHER PUBLICATIONS

"Industrial Equipment News . . . The Leading Publisher of New Products Worldwide" IEN, Apr. 2003—www.Inquiryexpress.com.

"LSI Unveils the LumeLEX at ARC06" Lighting Services Inc. Product News Press Release, obtained from http://www.lightingservicesinc.com/press_article.asp!pressID=103, printed on Feb. 16, 2006.

"Bridging the Gap for LEDs in the Architectural and Lighting Markets", Brent York, Blue 2005, May 16-19.

"TIR Systems' Partner Lighting Services Inc Unveils First Pro Based on Lexel Technology at ARC06 in London", TIR News Release obtained from http://www.tirsys.com/company/news/archive/2006-02-13.htm, printed on Feb. 16, 2006.

"Commercializing Innovative SSL Technology: From the Laboratory to Lighting", Leonard Hordyk, Strategies in Light, Feb. 16, 2006.

"Bridging the Gap: From LEDs to Lighting", Grant Harlow, Workshop 4: LED Technology, Lightfair 2005, Apr. 11, 2005.

"Holographic Diffusers", EO Edmund Industrial Optics, available at http://www.edmundoptics.com/onlinecatalog/DisplayProduct.dfm?productid-1363.

Stelgerwald, Daniel A., et al. "Illumination With Solid State Lighting Technology." IEEE Journal on Selected Topics in Quantum Electronics, vol. 8, No. 2, Mar./Apr. 2002, pp. 310-320.

Xiang, Hector. "efg's Chromaticity Diagrams Lab Report." URL: http://www.efg2.com/Lab/Graphics/Colors/Chromaticity.htm pp. 1-15.

Tawil, Joe., et al. "Colorimetry." URL: http://www.cameragulld.com/technology/colrlmetry.htm pp. 1-13.

U.S. Office Action issued in U.S. Appl. No. 11/233,036, filed May 30, 2007.

Official Action for U.S. Appl. No. 11/233,036, filed Nov. 15, 2007.

Official Action for U.S. Appl. No. 10/558,481, filed Nov. 8, 2007.

Official Action for U.S. Appl. No. 11/452,280, filed Dec. 14, 2007.

European Search Report issued in European Patent Application No. 05758377.5-1268/1740883 dated Jul. 2, 2008.

European Search Report issued in European Patent Application No. 05740253.9-1268/1740882 dated Jul. 4, 2008.

European Search Report issued in European Patent Application No. 05756155.7-1268/1740350 dated Jul. 2, 2008.

* cited by examiner

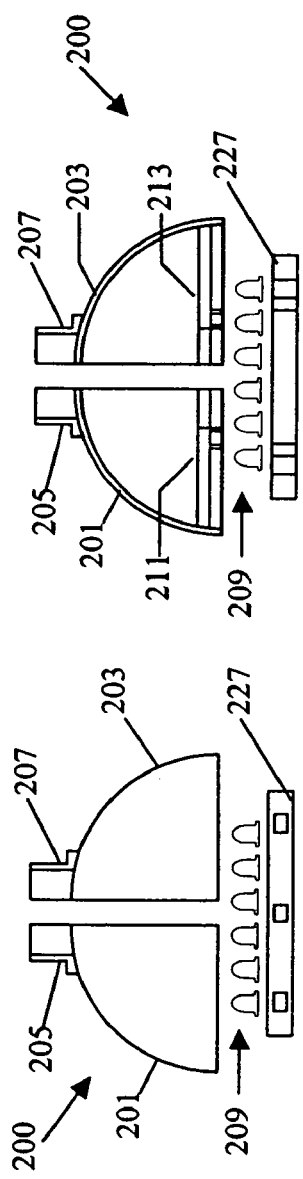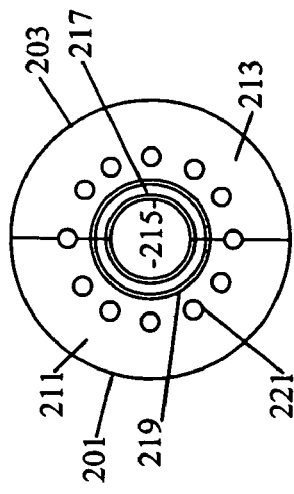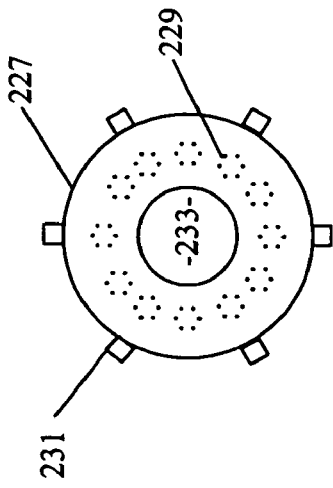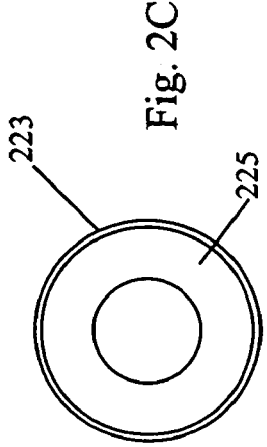

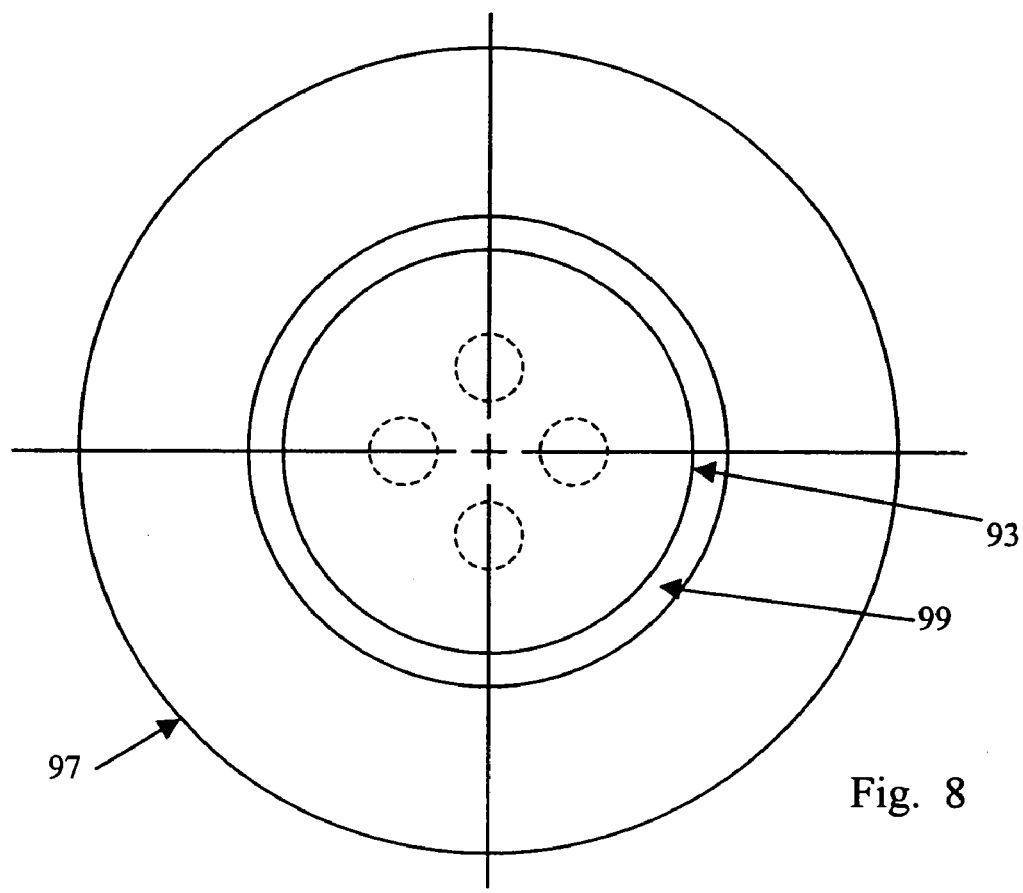
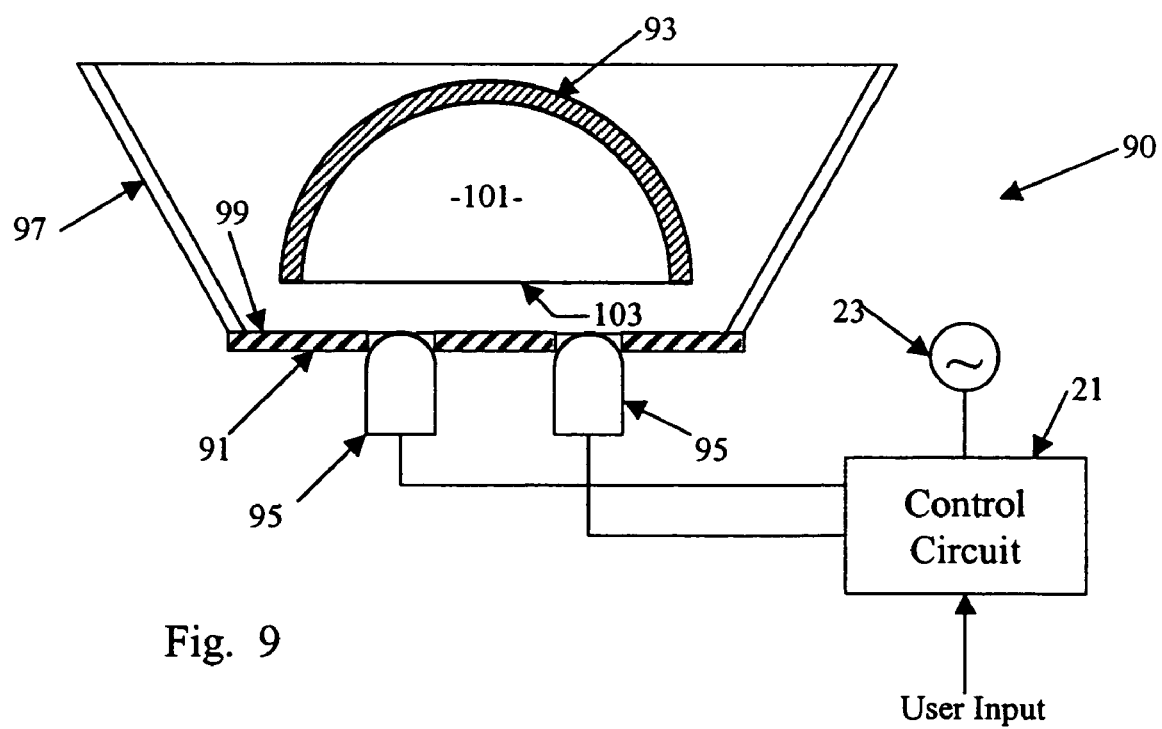
Fig. 8
Fig. 9

INTEGRATING CHAMBER CONE LIGHT USING LED SOURCES

RELATED APPLICATIONS

This application is a continuation of application Ser. No. 10/601,101, filed Jun. 23, 2003, which issued as U.S. Pat. No. 7,145,125 to May et al., the contents of which are herewith incorporated by reference.

TECHNICAL FIELD

The present subject matter relates to techniques and equipment to provide radiant energy having a selectable spectral characteristic (e.g. a selectable color characteristic), by combining selected amounts of radiant energy of different wavelengths from different sources, using an integrating cavity.

BACKGROUND

An increasing variety of lighting applications require a precisely controlled spectral characteristic of the radiant energy. It has long been known that combining the light of one color with the light of another color creates a third color. For example, the commonly used primary colors Red, Green and Blue of different amounts can be combined to produce almost any color in the visible spectrum. Adjustment of the amount of each primary color enables adjustment of the spectral properties of the combined light stream. Recent developments for selectable color systems have utilized light emitting diodes as the sources of the different light colors.

Light emitting diodes (LEDs) were originally developed to provide visible indicators and information displays. For such luminance applications, the LEDs emitted relatively low power. However, in recent years, improved LEDs have become available that produce relatively high intensities of output light. These higher power LEDs, for example, have been used in arrays for traffic lights. Today, LEDs are available in almost any color in the color spectrum.

Systems are known which combine controlled amounts of projected light from at least two LEDs of different primary colors. Attention is directed, for example, to U.S. Pat. Nos. 6,459,919, 6,166,496 and 6,150,774. Typically, such systems have relied on using pulse-width modulation or other modulation of the LED driver signals to adjust the intensity of each LED color output. The modulation requires complex circuitry to implement. Also, such prior systems have relied on direct radiation or illumination from the source LEDs. In some applications, the LEDs may represent undesirably bright sources if viewed directly. Also, the direct illumination from LEDs providing multiple colors of light has not provided optimum combination throughout the field of illumination.

Another problem arises from long-term use of LED type light sources. As the LEDs age, the output intensity for a given input level of the LED drive current decreases. As a result, it may be necessary to increase power to an LED to maintain a desired output level. This increases power consumption. In some cases, the circuitry may not be able to provide enough light to maintain the desired light output level. As performance of the LEDs of different colors declines differently with age (e.g. due to differences in usage), it may be difficult to maintain desired relative output levels and therefore difficult to maintain the desired spectral characteristics of the combined output. The output levels of LEDs also vary with actual temperature (thermal) that may be caused by differences in ambient conditions or different operational heating and/or cooling of different LEDs. Temperature induced changes in performance cause changes in the spectrum of light output.

U.S. Pat. No. 6,007,225 to Ramer et al. (Assigned to Advanced Optical Technologies, L.L.C.) discloses a directed lighting system utilizing a conical light deflector. At least a portion of the interior surface of the conical deflector has a specular reflectivity. In several disclosed embodiments, the source is coupled to an optical integrating cavity; and an outlet aperture is coupled to the narrow end of the conical light deflector. This patented lighting system provides relative uniform light intensity and efficient distribution of light over a field of illumination defined by the angle and distal edge of the deflector. However, this patent does not discuss particular color combinations or effects.

Hence, a need still exists for a technique to efficiently combine energy from multiple sources having multiple wavelengths and direct the radiant energy effectively toward a desired field of illumination. A related need still exists for such a system that does not require complex electronics (e.g. modulation circuitry) to control the intensity of the energy output from the sources of the radiant energy of different wavelengths. A need also exists for a technique to effectively maintain a desired energy output level and the desired spectral character of the combined output as LED performance decreases with age, preferably without requiring excessive power levels.

SUMMARY

Systems disclosed herein include a light fixture for a visible lighting application and a control circuit; and in such systems, the fixture includes an optical integrating cavity. Light sources, for example light emitting diodes, supply light of different spectral characteristics (e.g. different colors) for diffuse reflection within the cavity. As a result, the cavity optically integrates the light for emission via an optical passage. In the illustrated examples, the optical passage is an aperture through a wall of the optical integrating cavity.

In the examples, the points of entry of the energy from the sources into the cavity are located so that the emission points are not directly visible through the aperture. Each source typically comprises one or more light emitting diodes (LEDs). It is possible to install any desirable number of LEDs. Hence, In several examples, the sources may comprise one or more LEDs for emitting light of a first color, and one or more LEDs for emitting light of a second color, wherein the second color is different from the first color. In a similar fashion, the apparatus may include additional LED sources of a third color, a fourth color, etc. To achieve the highest color-rendering index (CRI), the LED array may include LEDs of colors that effectively cover the entire visible spectrum.

These sources can include any color or wavelength, but typically include red, green, and blue. The integrating or mixing capability of the chamber serves to project light of any color, including white light, by adjusting the intensity of the various sources coupled to the cavity. Hence, it is possible to control color rendering index, as well as color temperature. The system works with the totality of light output from a family of LEDs. However, to provide color adjustment or variability, it is not necessary to control the output of individual LEDs, except as the intensity of each contributes to the totality. For example, it is not necessary to modulate the LED outputs. Also, the distribution pattern of the LEDs is not significant. The LEDs can be arranged in any manner to supply radiant energy within the chamber, although typically direct view from outside the fixture is avoided.

The LED sources may be coupled to openings at the points on the interior of the cavity, to emit radiant energy directly into the interior of the integrating cavity. It is also envisioned that the sources may be somewhat separated from the cavity, in which case, the device might include optical fibers coupled between the sources and the integrating cavity, to supply radiant energy from the sources to the emission points into the interior of the cavity.

In the disclosed examples, the apparatus further comprises a conical deflector. A small opening at a proximal end of the deflector is coupled to the aperture of the integrating cavity. The deflector has a larger opening at a distal end thereof. The deflector comprises a reflective interior surface between the distal end and the proximal end. In the examples, at least a substantial portion of the reflective interior surface of the conical deflector exhibits specular reflectivity with respect to the combined radiant energy. The conical deflector defines an angular field of radiant energy emission from the apparatus.

A number of different examples of control circuits are discussed below. In one example, the control circuitry comprises a color sensor coupled to detect color distribution in the combined radiant energy. Associated logic circuitry, responsive to the detected color distribution, controls the output intensity of the various LEDs, so as to provide a desired color distribution in the integrated radiant energy.

The control circuitry may include an appropriate device for manually setting the desired spectral characteristic, for example, one or more variable resistors or one or more dip switches, to allow a user to define or select the desired color distribution.

Automatic controls also are envisioned. For example, the control circuitry may include a data interface coupled to the logic circuitry, for receiving data defining the desired color distribution. Such an interface would allow input of control data from a separate or even remote device, such as a personal computer, personal digital assistant or the like. A number of the devices, with such data interfaces, may be controlled from a common central location or device.

The disclosed apparatus may use a variety of different structures or arrangements for the integrating cavity. It is desirable that the interior cavity surface have a highly efficient diffusely reflective characteristic, e.g. a reflectivity of over 90%, with respect to the relevant wavelengths, in order to maximize optical efficiency. In several examples, the cavity is formed of a diffusely reflective plastic material, such as a polypropylene having a 98% reflectivity and a diffuse reflective characteristic. Another example of a material with a suitable reflectivity is SPECTRALON. Alternatively, the integrating cavity may comprise a rigid substrate having an interior surface, and a diffusely reflective coating layer formed on the interior surface of the substrate so as to provide the diffusely reflective interior surface of the integrating cavity.

A variety of different shapes may be used for the interior reflective surface of the cavity. Although it may be rectangular, triangular or in the shape of a pyramid, in the examples, the diffusely reflective interior surface of the integrating cavity has a shape corresponding to a substantial portion of a sphere (e.g. hemispherical) or a substantial portion of a cylinder (e.g. approximating a half-cylinder).

The inventive devices have numerous applications, and the output intensity and spectral characteristic may be tailored and/or adjusted to suit the particular application. For example, the intensity of the integrated light emitted through the aperture may be at a level for use in a lumination application or at a level sufficient for a task lighting application.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 2A is an exploded side-view of the components of a fixture usable as the cavity, deflector and sources, in the system of FIG. 1.

FIG. 2B is an exploded view of the components of FIG. 2A, with those components shown in cross-section.

FIG. 2C is an end view of the deflector.

FIG. 2D is an end view of the cavity assembly.

FIG. 2E is a plan view of the LED support ring.

FIG. 8 illustrates an alternate example of a radiant energy emitting system, utilizing principles of constructive occlusion.

FIG. 9 is a top plan view of the fixture in the system of FIG. 8.

FIG. 11 is a circuit diagram showing the electrical components, of one of the radiant energy emitting systems, using analog control circuitry.

DETAILED DESCRIPTION

Figure 1:
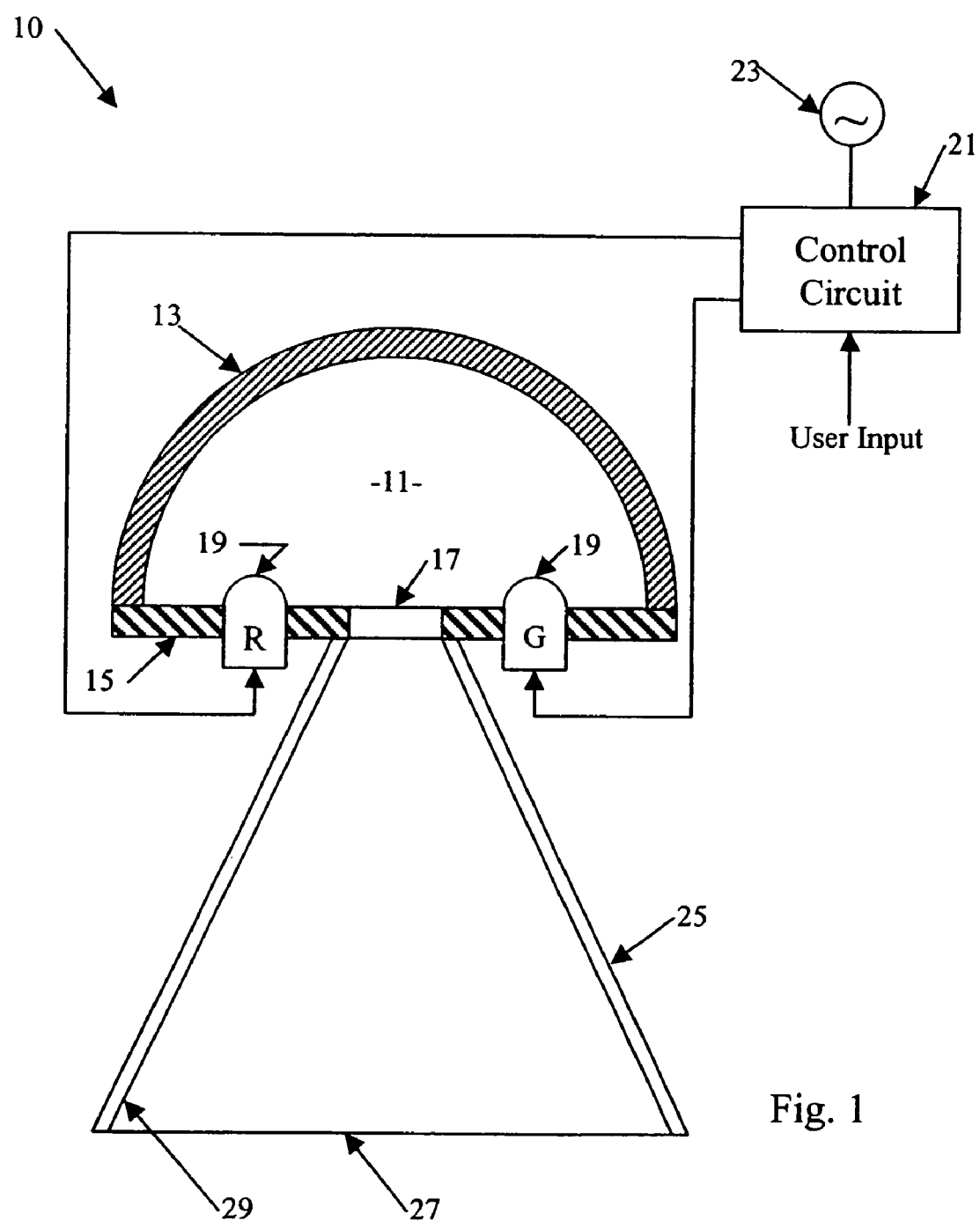
FIG. 1 illustrates an example of a radiant energy emitting system, with certain elements thereof shown in cross-section.

Reference now is made in detail to the examples illustrated in the accompanying drawings and discussed below. FIG. 1 is a cross-sectional illustration of a radiant energy distribution apparatus or system 10. For task lighting applications, the apparatus emits light in the visible spectrum, although the device 10 may be used for lumination applications and/or with emissions in or extending into the infrared and/or ultraviolet portions of the radiant energy spectrum.

The illustrated apparatus 10 includes an integrating cavity 11 having a diffusely reflective interior surface. The cavity 11 may have various shapes. The illustrated cross-section would be substantially the same if the cavity is hemispherical or if the cavity is semi-cylindrical with the cross-section taken perpendicular to the longitudinal axis.

The disclosed apparatus may use a variety of different structures or arrangements for the integrating cavity, examples of which are discussed below relative to FIGS. 3-9. It is desirable that the cavity surface have a highly efficient diffusely reflective characteristic, e.g. a reflectivity of over 90%, with respect to the relevant wavelengths. In the example, the surface is highly diffusely reflective to energy in the visible, near-infrared, and ultraviolet wavelengths.

The cavity may be formed of a diffusely reflective plastic material, such as a polypropylene having a 98% reflectivity and a diffuse reflective characteristic. Such a highly reflective polypropylene is available from Ferro Corporation—Specialty Plastics Group, Filled and Reinforced Plastics Division, in Evansville, Ind. Another example of a material with a suitable reflectivity is SPECTRALON. Alternatively, the integrating cavity may comprise a rigid substrate having an interior surface, and a diffusely reflective coating layer formed on the interior surface of the substrate so as to provide the diffusely reflective interior surface of the integrating cavity. The coating layer, for example, might take the form of a flat-white paint. A suitable paint might include a zinc-oxide based pigment, consisting essentially of an uncalcined zinc oxide and preferably containing a small amount of a dispersing agent. The pigment is mixed with an alkali metal silicate vehicle-binder, which preferably is a potassium silicate, to form the coating material. For more information regarding the paint, attention is directed to U.S. patent application Ser. No. 09/866,516, which was filed May 29, 2001, by Matthew Brown.

For purposes of the discussion, the cavity 11 in the apparatus 10 is assumed to be hemispherical. In the example, a hemispherical dome 13 and a substantially flat cover plate 15 form the cavity 11. At least the interior facing surfaces of the dome 13 and the cover plate 15 are highly diffusely reflective, so that the resulting integrating cavity 11 is highly diffusely reflective with respect to the radiant energy spectrum produced by the device 10. Although shown as separate elements, the dome and plate may be formed as an integral unit.

The integrating cavity 11 has an aperture 17 for allowing emission of combined radiant energy. In the example, the aperture 17 is a passage through the approximate center of the cover plate 15. Because of the diffuse reflectivity within the cavity 11, light within the cavity is integrated before passage out of the aperture 17. In the examples, the apparatus 10 is shown emitting the combined radiant energy downward through the aperture 17, for convenience. However, the apparatus 10 may be oriented in any desired direction to perform a desired application function, for example to provide visible luminance to persons in a particular direction or location with respect to the fixture or to illuminate a different surface such as a wall, floor or table top.

The apparatus 10 also includes sources of radiant energy of different wavelengths. In the example, the sources are LEDs 19, two of which are visible in the illustrated cross-section. The LEDs 19 supply radiant energy into the interior of the integrating cavity 11. As shown, the points of emission into the interior of the integrating cavity are not directly visible through the aperture 17. At least the two illustrated LEDs emit radiant energy of different wavelengths. Additional LEDs of the same or different colors may be provided. The cavity 11 effectively integrates the energy of different wavelengths, so that the integrated or combined radiant energy emitted through the aperture 17 includes the radiant energy of all the various wavelengths in relative amounts substantially corresponding to the relative intensities of input into the cavity.

The source LEDs 19 can include LEDs of any color or wavelength. Typically, an array of LEDs for a visible light application includes at least red, green, and blue LEDs. The integrating or mixing capability of the cavity 11 serves to project light of any color, including white light, by adjusting the intensity of the various sources coupled to the cavity. Hence, it is possible to control color rendering index (CRI), as well as color temperature. The system works with the totality of light output from a family of LEDs 19. However, to provide color adjustment or variability, it is not necessary to control the output of individual LEDs, except as they contribute to the totality. For example, it is not necessary to modulate the LED outputs. Also, the distribution pattern of the individual LEDs and their emission points into the cavity are not significant. The LEDs 19 can be arranged in any manner to supply radiant energy within the chamber, so long as direct view from outside the fixture is avoided.

In this example, light outputs of the LED sources 19 are coupled directly to openings at points on the interior of the cavity 11, to emit radiant energy directly into the interior of the integrating cavity. The LEDs may be located to emit light at points on the interior wall of the element 13, though preferably such points would still be in regions out of the direct line of sight through the aperture 17. For ease of construction, however, the openings for the LEDs 19 are formed through the cover plate 15. On the plate, the openings/LEDs may be at any convenient locations.

The apparatus 10 also includes a control circuit 21 coupled to the LEDs 19 for establishing output intensity of radiant energy of each of the LED sources. The control circuit 21 typically includes a power supply circuit coupled to a source, shown as an AC power source 23. The control circuit 21 also includes an appropriate number of LED driver circuits for controlling the power applied to each of the individual LEDs 19 and thus the intensity of radiant energy supplied to the cavity 11 for each different wavelength. Control of the intensity of emission of the sources sets a spectral characteristic of the combined radiant energy emitted through the aperture of the integrating cavity. The control circuit 21 may be responsive to a number of different control input signals, for example, in response to one or more user inputs as shown by the arrow in FIG. 1. Although not shown in this simple example, feedback may also be provided. Specific examples of the control circuitry are discussed in more detail later.

The color integrating energy distribution apparatus may also utilize one or more conical deflectors having a specular reflective inner surface, to efficiently direct most of the light emerging from a light source into a relatively narrow field of view. Hence, the exemplary apparatus shown in FIG. 1 also comprises a conical deflector 25. A small opening at a proximal end of the deflector is coupled to the aperture 17 of the integrating cavity 11. The deflector 25 has a larger opening 27 at a distal end thereof. The angle and distal opening of the conical deflector 25 define an angular field of radiant energy emission from the apparatus 10. Although not shown, the large opening of the deflector may be covered with a transparent plate or lens, or covered with a grating, to prevent entry of dirt or debris through the cone into the system.

The conical deflector may have a variety of different shapes, depending on the particular lighting application. In the example, where cavity 11 is hemispherical, the cross-section of the conical deflector is typically circular. However, the deflector may be somewhat oval in shape. In applications using a semi-cylindrical cavity, the deflector may be elongated or even rectangular in cross-section. The shape of the aperture 17 also may vary, but will typically match the shape of the small end opening of the deflector 25. Hence, in the example, the aperture 17 would be circular. However, for a device with a semi-cylindrical cavity and a deflector with a rectangular cross-section, the aperture may be rectangular.

The deflector 25 comprises a reflective interior surface 29 between the distal end and the proximal end. In the examples, at least a substantial portion of the reflective interior surface 29 of the conical deflector exhibits specular reflectivity with respect to the integrated radiant energy. As discussed in U.S. Pat. No. 6,007,225, for some applications, it may be desirable to construct the deflector 25 so that at least some portion(s) of the inner surface 29 exhibit diffuse reflectivity or exhibit a different degree of specular reflectivity (e.g., -quasi-specular), so as to tailor the performance of the deflector 25 to the particular application.

In the examples, each source of radiant energy of a particular wavelength comprises one or more light emitting diodes (LEDs). Within the chamber, it is possible to process light received from any desirable number of LEDs. Hence, in several examples, the sources may comprise one or more LEDs for emitting light of a first color, and one or more LEDs for emitting light of a second color, wherein the second color is different from the first color. In a similar fashion, the apparatus may include additional sources comprising one or more LEDs of a third color, a fourth color, etc. To achieve the highest color rendering index (CRI), the LED array may include LEDs of various wavelengths that cover virtually the entire visible spectrum.

FIGS. 2A to 2E are detail views of the light fixture components of an example of a system of the type described above relative to FIG. 1. FIG. 2A is an exploded side-view of the set 200 of the fixture components, and FIG. 2B is a similar view but showing some of those components in cross-section. As shown, the fixture elements 200 include two quarter-spherical domes 201 and 203 that are joined to form the integrating cavity and a portion of an LED mounting structure. The domes 201 and 203 are formed of a rigid material having a highly diffusely reflective inner surface, as discussed above.

Each dome includes a boss 205 or 207 near the back apex thereof. When the domes 201 and 203 are joined to form the cavity, the bosses 205 and 207 together form a ring-shaped back shoulder that can be used for mounting the fixture.

The illustrated components also include twelve LEDs 209 (six of which are visible in FIGS. 2A and 2B). The LEDs 209 provide different wavelengths of light as discussed earlier. In one example, the device includes six Red LEDs, three Green LEDs and three Blue LEDs.

FIG. 2D is an end view of the cavity assembly, that is to say, showing the two domes 201 and 203 joined together. As shown in cross-section in FIG. 2B, each dome includes an inwardly extending half-circular shoulder 211 or 213. When the domes are joined as in FIG. 2D, these shoulders 211, 213 together form a ring-shaped cover of the cavity. The ring-shaped cover provides one half of a sandwich like structure, for supporting the LEDs 209. The central opening 215 of the cover forms the aperture of the integrating cavity. Openings 221 through the cover allow passage of light from the LEDs 209 into the interior of the cavity.

The shoulders 211 and 213 include two half-circular bosses around respective portions of the inner opening 215. When the two halves of the cavity structure are joined (FIG. 2D), these bosses form two inner flanges 217 and 219, extending toward the direction of intended illumination. The groove formed between the flanges 217 and 219 receives the distal end of the conical deflector 223. FIG. 2C is an end view of the deflector 223. In the example, the entire inner surface 225 of the deflector 223 has a specular reflective characteristic.

As discussed and shown, the cavity assembly includes shoulders 211 and 213, which together form the cover of the cavity and form half of the LED support structure. The LEDs 209 are attached to the back (upward side in FIGS. 2A and 2B) of an LED support ring 227, which provides the other half of the LED support structure. The LED support ring 227 may be made of a suitable rigid material, which is resistant to the heat generated by the LEDs. For example, the LED support ring 227 may be constructed of aluminum, to provide the necessary structural support and to act as a heat sink to wick away a substantial portion of the heat generated by the attached LEDs 209. Although not shown, ventilation or other cooling elements may also be provided.

In this example, for each LED 209, there are six small mounting holes 229 through the LED support ring 227 (see FIG. 2E). The LED support ring 227 also has six outwardly extending 'tabs' 231 around its perimeter, to facilitate mounting. Although not shown for convenience, the cavity assembly (FIG. 2D) has three small bosses/tabs around the outside that mate to three of the six tabs 231 on the LED support ring 227.

The central passage 233 of the LED support ring 227 is somewhat larger in diameter than the proximal (small) end of the conical deflector 223. During assembly, the proximal end of the conical deflector 223 passes through the opening 233 and mates in the groove formed between the groove formed between the flanges 217 and 219. In this way, the proximal end of the deflector surrounds the aperture 215. Those skilled in the art will recognize that the structure of FIGS. 2A to 2E is exemplary and other structures may be used, for example, to mount desired numbers of LEDs and/or to couple/attach the deflector to the aperture.

Figure 3:
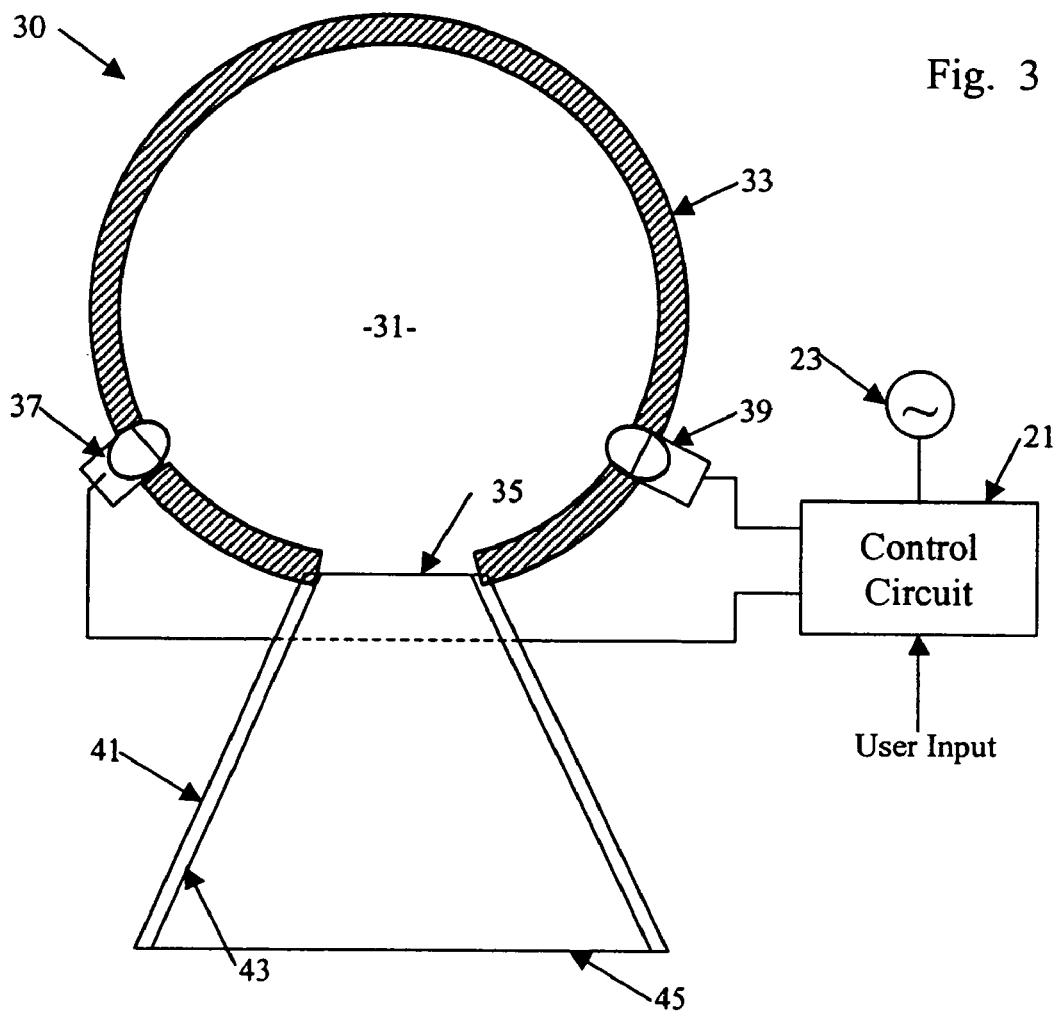
FIG. 3 illustrates another example of a radiant energy emitting system, with certain elements thereof shown in cross-section.
Figure 4:
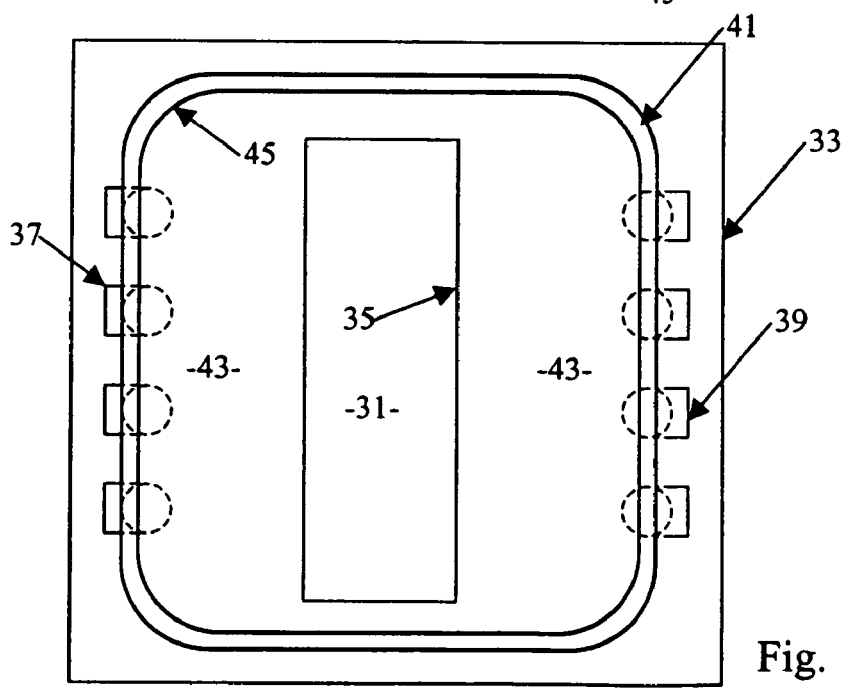
FIG. 4 is a bottom view of the fixture in the system of FIG. 3.

FIGS. 3 and 4 illustrate another example of a radiant energy distribution apparatus or system. FIG. 3 shows the overall system 30, including the fixture and the control circuitry. The fixture is shown in cross-section. FIG. 4 is a bottom view of the fixture. The system 30 is generally similar the system 10. For example, the system 30 may utilize essentially the same type of control circuit 21 and power source 23, as in the earlier example. However, the shape of the integrating cavity and the deflector are somewhat different.

The integrating cavity 31 has a diffusely reflective interior surface. In this example, the cavity 31 has a shape corresponding to a substantial portion of a cylinder. In the cross-sectional view of FIG. 3 (taken across the longitudinal axis of the cavity), the cavity 31 appears to have an almost circular shape. In this example, the cavity 31 is formed by a cylindrical element 33. At least the interior surface of the element 33 is highly diffusely reflective, so that the resulting integrating cavity 31 is highly diffusely reflective with respect to the radiant energy spectrum produced by the device 30.

The integrating cavity 31 has an aperture 35 for allowing emission of combined radiant energy. In this example, the aperture 35 is a rectangular passage through the wall of the cylindrical element 33. Because of the diffuse reflectivity within the cavity 31, light within the cavity is integrated before passage out of the aperture 35.

The apparatus 30 also includes sources of radiant energy of different wavelengths. In this example, the sources comprise LEDs 37, 39. The LEDs are mounted in openings through the wall of the cylindrical element 33, to essentially form two rows of LEDs on opposite sides of the aperture 35. The positions of these openings, and thus the positions of the LEDs 37 and 39, typically are such that the LED outputs are not directly visible through the aperture 35, otherwise the locations are a matter of arbitrary choice.

Thus, the LEDs 37 and 39 supply radiant energy into the interior of the integrating cavity 31, through openings at points on the interior surface of the integrating cavity not directly visible through the aperture 35. A number of the LEDs emit radiant energy of different wavelengths. For example, arbitrary pairs of the LEDs 37, 39 might emit four different colors of light, e.g. Red, Green, Blue and a fourth color chosen to provide an increased variability of the spectral characteristic of the integrated radiant energy.

Alternatively, a number of the LEDs may be initially active LEDs, whereas others are initially inactive sleeper LEDs. For example, the initially active LEDs might include two Red LEDs, two Green LEDs and a Blue LED; and the sleeper LEDs might include one Red LED, one Green LED and one Blue LED.

The control circuit 21 controls the power provided to each of the LEDs 37 and 39. The cavity 31 effectively integrates the energy of different wavelengths, from the various LEDs 37 and 39, so that the integrated radiant energy emitted through the aperture 35 includes the radiant energy of all the various wavelengths. Control of the intensity of emission of the sources, by the control circuit 21, sets a spectral characteristic of the integrated radiant energy emitted through the aperture 35. If sleeper LEDs are provided, the control also activates one or more dormant LEDs, when extra output of a particular wavelength or color is required.

The color integrating energy distribution apparatus 30 may also include a deflector 41 having a specular reflective inner surface 43, to efficiently direct most of the light emerging from the aperture into a relatively narrow field of view. The deflector 41 expands outward from a small end thereof coupled to the aperture 35. The deflector 41 has a larger opening 45 at a distal end thereof. The angle of the side walls of the deflector and the shape of the distal opening 45 of the deflector 41 define an angular field of radiant energy emission from the apparatus 30.

As noted above, the deflector may have a variety of different shapes, depending on the particular lighting application. In the example, where the cavity 31 is substantially cylindrical, and the aperture is rectangular, the cross-section of the deflector 41 (viewed across the longitudinal axis as in FIG. 3) typically appears conical, since the deflector expands outward as it extends away from the aperture 35. However, when viewed on-end (bottom view—FIG. 4), the openings are substantially rectangular, although they may have somewhat rounded corners. Alternatively, the deflector 41 may be somewhat oval in shape. The shapes of the cavity and the aperture may vary, for example, to have rounded ends, and the deflector may be contoured to match the aperture.

The deflector 41 comprises a reflective interior surface 43 between the distal end and the proximal end. In the examples, at least a substantial portion of the reflective interior surface 43 of the conical deflector exhibits specular reflectivity with respect to the combined radiant energy, although regions exhibiting a different reflectivity may be provided, as noted in the discussion of FIG. 1.

If provided, "sleeper" LEDs would be activated only when needed to maintain the light output, color, color temperature, and/or thermal temperature. As discussed later with regard to an exemplary control circuit, the system 30 could have a color sensor coupled to provide feedback to the control circuit 21. The sensor could be within the cavity or the deflector or at an outside point illuminated by the integrated light from the fixture.

As LEDs age, they continue to operate, but at a reduced output level. The use of the sleeper LEDs greatly extends the lifecycle of the fixtures. Activating a sleeper (previously inactive) LED, for example, provides compensation for the decrease in output of the originally active LED. There is also more flexibility in the range of intensities that the fixtures may provide.

Figure 5:
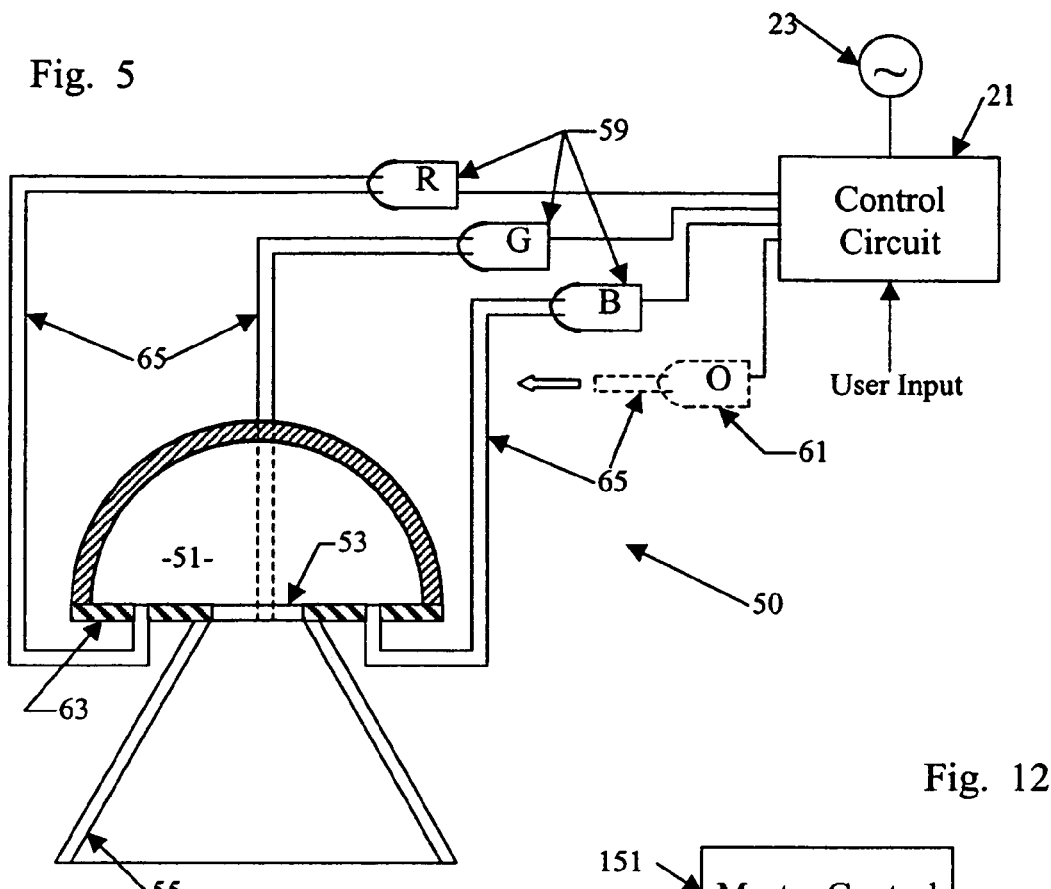
FIG. 5 illustrates another example of a radiant energy emitting system, using fiber optic links from the LEDs to the integrating cavity.

In the examples discussed above relative to FIG. 1 to 4, the LED sources were coupled directly to openings at the points on the interior of the cavity, to emit radiant energy directly into the interior of the integrating cavity. It is also envisioned that the sources may be somewhat separated from the cavity, in which case, the device might include optical fibers or other forms of light guides coupled between the sources and the integrating cavity, to supply radiant energy from the sources to the emission points into the interior of the cavity. FIG. 5 depicts such a system 50, which uses optical fibers.

The system 50 includes an integrating cavity 51, an aperture 53 and a deflector with a reflective interior surface 55, similar to those in the earlier embodiments. The interior surface of the integrating cavity 51 is highly diffusely reflective, whereas the deflector surface 55 exhibits a specular reflectivity.

The system 50 includes a control circuit 21 and power source 23, as in the earlier embodiments. In the system 50, the radiant energy sources comprises LEDs 59 of three different wavelengths, e.g. to provide Red, Green and Blue light respectively. The sources may also include one or more additional LEDs 61, either of a different color or for use as 'sleepers,' similar to the example of FIGS. 3 and 4. In this example (FIG. 5), the cover plate 63 of the cavity 51 has openings into which are fitted the light emitting distal ends of optical fibers 65. The proximal light receiving ends of the fibers 65 are coupled to receive light emitted by the LEDs 59 (and 61 if provided). In this way, the LED sources 59, 61 may be separate from the chamber 51, for example, to allow easier and more effective dissipation of heat from the LEDs. The fibers 65 transport the light from the LED sources 59, 61 to the cavity 51. The cavity 51 integrates the different colors of light from the LEDs as in the earlier examples and supplies combined light out through the aperture 53. The deflector, in turn, directs the combined light to a desired field. Again, the intensity control by the circuit 21 adjusts the amount or intensity of the light of each wavelength provided by the LED sources and thus controls the spectral characteristic of the combined light output.

A number of different examples of control circuits are discussed below. In one example, the control circuitry comprises a color sensor coupled to detect color distribution in the integrated radiant energy. Associated logic circuitry, responsive to the detected color distribution, controls the output intensity of the various LEDs, so as to provide a desired color distribution in the integrated radiant energy. In an example using sleeper LEDs, the logic circuitry is responsive to the detected color distribution to selectively activate the inactive light emitting diodes as needed, to maintain the desired color distribution in the integrated radiant energy.

To provide a uniform output distribution from the apparatus, it is also possible to construct the cavity so as to provide constructive occlusion. Constructive Occlusion type transducer systems utilize an electrical/optical transducer optically coupled to an active area of the system, typically the aperture of a cavity or an effective aperture formed by a reflection of the cavity. The systems utilize diffusely reflective surfaces, such that the active area exhibits a substantially Lambertian characteristic. A mask occludes a portion of the active area of the system, in the examples, the aperture of the cavity or the effective aperture formed by the cavity reflection, in such a manner as to achieve a desired response or output performance characteristic for the system. In examples of the present apparatus using constructive occlusion, the integrating cavity comprises a base, a mask and a cavity in either the base or the mask. The mask would have a diffusely reflective surface facing toward the aperture. The mask is sized and positioned relative to the active area so as to constructively occlude the active area. It may be helpful to consider two examples using constructive occlusion.

Figure 6:
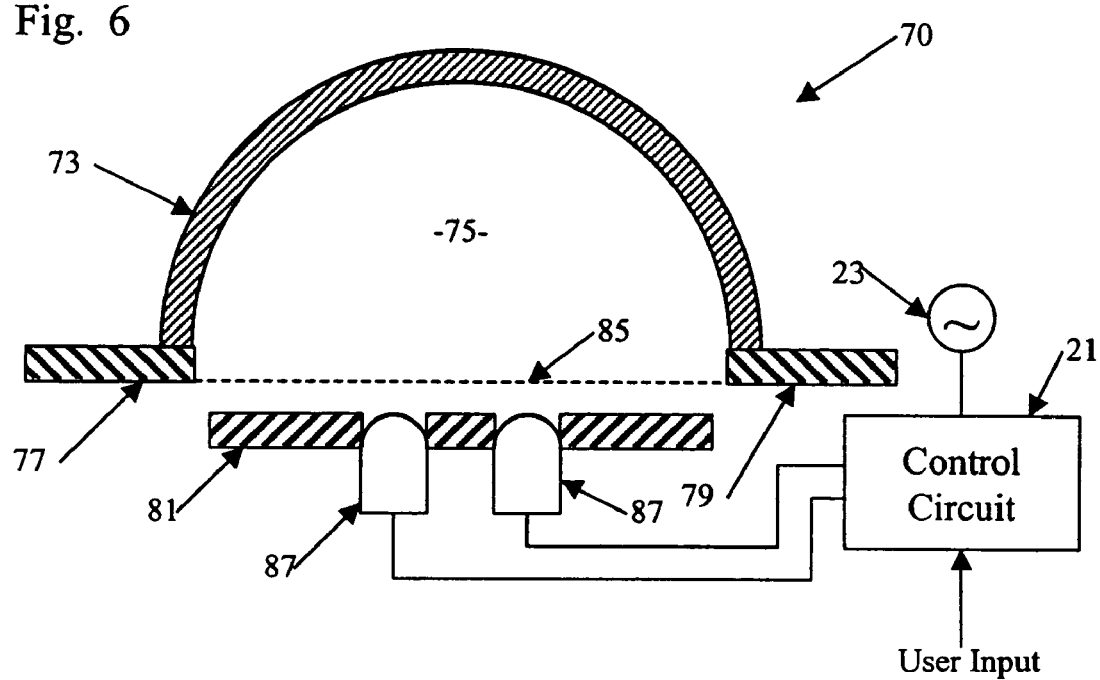
FIG. 6 illustrates another example of a radiant energy emitting system, utilizing principles of constructive occlusion.
Figure 7:
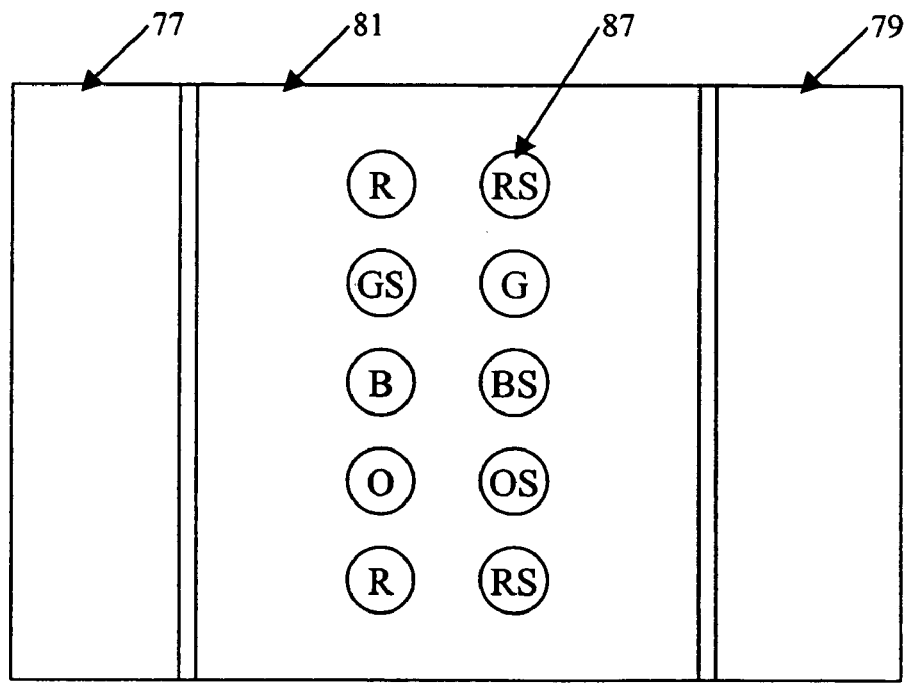
FIG. 7 is a bottom view of the fixture in the system of FIG. 6.

FIGS. 6 and 7 depict a first, simple embodiment of a light distributor apparatus or system 70, for projecting integrated multi-wavelength light with a tailored intensity distribution, using the principles of constructive occlusion. In the cross-section illustration, the system 70 is oriented to provide downward illumination. Such a system might be mounted in or suspended from a ceiling or canopy or the like. Those skilled in the art will recognize that the designer may choose to orient the system 70 in different directions, to adapt the system to other lighting applications.

The lighting system 70 includes a base 73, having or forming a cavity 75, and adjacent shoulders 77 and 79, constructed in a manner similar to the elements forming integrating cavities in the earlier examples. In particular, the interior of the cavity 75 is diffusely reflective, and the down-facing surfaces of shoulders 77 and 79 may be reflective. If the shoulder surfaces are reflective, they may be specular or diffusely reflective. A mask 81 is disposed between the cavity aperture 85 and the field to be illuminated. In this symmetrical embodiment, the interior wall of a half-cylindrical base 73 forms the cavity; therefore the aperture 85 is rectangular. The shoulders 77 formed along the sides of the aperture 85 are rectangular. If the base were circular, with a hemispherical cavity, the shoulders typically would form a ring that may completely surround the aperture.

In many constructive occlusion embodiments, the cavity 75 comprises a substantial segment of a sphere. For example, the cavity may be substantially hemispherical, as in earlier examples. However, the cavity's shape is not of critical importance. A variety of other shapes may be used. In the illustrated example, the half-cylindrical cavity 75 has a rectangular aperture, and if extended longitudinally, the rectangular aperture may approach a nearly linear aperture (slit). Practically any cavity shape is effective, so long as it has a diffuse reflective inner surface. A hemisphere or the illustrated half-cylinder shape are preferred for the ease in modeling for the light output toward the field of intended illumination and the attendant ease of manufacture. Also, sharp corners tend to trap some reflected energy and reduce output efficiency.

For purposes of constructive occlusion, the base 73 may be considered to have an active optical area, preferably exhibiting a substantially Lambertian energy distribution. Where the cavity is formed in the base, for example, the planar aperture 85 formed by the rim or perimeter of the cavity 75 forms the active surface with substantially Lambertian distribution of energy emerging through the aperture. As shown in a later embodiment, the cavity may be formed in the facing surface of the mask. In such a system, the surface of the base may be a diffusely reflective surface, therefore the active area on the base would essentially be the mirror image of the cavity aperture on the base surface, that is to say the area reflecting energy emerging from the physical aperture of the cavity in the mask.

The mask 81 constructively occludes a portion of the optically active area of the base with respect to the field of intended illumination. In the example of FIG. 6, the optically active area is the aperture 85 of the cavity 75; therefore the mask 81 occludes a substantial portion of the aperture 85, including the portion of the aperture on and about the axis of the mask and cavity system.

The relative dimensions of the mask 81 and aperture 85, for example the relative widths (or diameters or radii in a more circular system) as well as the distance of the mask 81 away from the aperture 85, control the constructive occlusion performance characteristics of the lighting system 70. Certain combinations of these parameters produce a relatively uniform emission intensity with respect to angles of emission, over a wide portion of the field of view about the system axis (vertically downward in FIG. 6), covered principally by the constructive occlusion. Other combinations of size and height result in a system performance that is uniform with respect to a wide planar surface perpendicular to the system axis at a fixed distance from the active area.

The shoulders 77, 79 also are reflective and therefore deflect at least some light downward. The angles of the shoulders and the reflectivity of the surfaces thereof facing toward the region to be illuminated by constructive occlusion also contribute to the intensity distribution over that region. In the illustrated example, the reflective shoulders are horizontal, although they may be angled somewhat downward from the plane of the aperture.

With respect to the energy of different wavelengths, the interior space formed between the cavity 75 and the facing surface of the mask 81 operates as an integrating cavity, in essentially the same manner as the integrating cavities in the previous embodiments. Again, the LEDs provide light of a number of different colors, and thus of different wavelengths. The integrating cavity combines the light of multiple color supplied from the LEDs 87. The control circuit 21 controls the amount of each color of light supplied to the chamber and thus the proportion thereof included in the combined output light. The constructive occlusion serves to distribute that light in a desired manner over a field or area that the system 70 is intended to illuminate.

The LEDs could be located at (or coupled by optical fiber to emit light) from any location or part of the surface of the cavity 75. Preferably, the LED outputs are not directly visible through the un-occluded portions of the aperture 85 (between the mask and the edge of the cavity). In examples of the type shown in FIGS. 6 and 7, the easiest way to so position the LED outputs is to mount the LEDs 87 (or provide fibers or the like) so as to supply light to the chamber through openings through the mask 81.

FIG. 7 also provides an example of an arrangement of the LEDs in which there are both active and inactive (sleeper) LEDs of the various colors. As shown, the active part of the array of LEDs 87 includes two Red LEDs (R), one Green LED (G) and one Blue LED (B). The initially inactive part of the array of LEDs 87 include one Red sleeper LEDs (RS), one Green sleeper LED (GS) and one Blue sleeper LED (BS). If other wavelengths are desired, the apparatus may include an active LED of the other color (O) as well as a sleeper LED of the other color (OS). The precise number, type, arrangement and mounting technique of the LEDs and the associated ports through the mask 81 are not critical. The number of LEDs, for example, is chosen to provide a desired level of output energy (intensity), for a given application.

The system 70 includes a control circuit 21 and power source 23. These elements control the operation and output intensity of each LED 87. The individual intensities determine the amount of each color light included in the integrated and distributed output. The control circuit 21 functions in essentially the same manner as in the other examples.

FIGS. 8 and 9 illustrate a second constructive occlusion example. In this example, the physical cavity is actually formed in the mask, and the active area of the base is a flat reflective panel of the base.

The illustrated system 90 comprises a flat base panel 91, a mask 93, LED light sources 95, and a conical deflector 97. The system 90 is circularly symmetrical about a vertical axis, although it could be rectangular or have other shapes. The base 91 includes a flat central region 99 between the walls of the deflector 97. The region 99 is reflective and forms or contains the active optical area on the base facing toward the region or area to be illuminated by the system 90.

The mask 93 is positioned between the base 91 and the region to be illuminated by constructive occlusion. For example, in the orientation shown, the mask 93 is above the active optical area 99 of the base 91, for example to direct light toward a ceiling for indirect illumination. Of course, the mask and cavity system could be inverted to serve as a downlight for task lighting applications, or the mask and cavity system could be oriented to emit light in directions appropriate for other applications.

In this example, the mask 93 contains the diffusely reflective cavity 101, constructed in a manner similar to the integrating cavities in the earlier examples. The physical aperture 103 of the cavity 101 and of any diffusely reflective surface(s) of the mask 93 that may surround that aperture form the active optical area on the mask 93. Such an active area on the mask faces away from the region to be illuminated and toward the active surface 99 on the base 91. The surface 99 is reflective, preferably with a diffuse characteristic. The surface 99 of the base 91 essentially acts to produce a diffused mirror image of the mask 93 with its cavity 101 as projected onto the base area 99. The reflection formed by the active area of the base becomes the effective aperture of the light integrating cavity (between the mask and base) when the fixture is considered from the perspective of the area of intended illumination. The surface area 99 reflects energy emerging from the aperture 103 of the cavity 101 in the mask 93. The mask 93 in turn constructively occludes light diffused from the active base surface 99 with respect to the region illuminated by the system 90. The dimensions and relative positions of the mask and active region on the base control the performance of the system, in essentially the same manner as in the mask and cavity system of FIGS. 6 and 7.

The system 90 includes a control circuit 21 and associated power source 23, for supplying controlled electrical power to the LED sources 95. In this example, the LEDs emit light through openings through the base 91, preferably at points not directly visible from outside the system. The LEDs 95 supply various wavelengths of light, and the circuit 21 controls the power of each LED, to control the amount of each color of light in the combined output, as discussed above relative to the other examples.

The base 91 could have a flat ring-shaped shoulder with a reflective surface. In this example, however, the shoulder is angled toward the desired field of illumination to form a conical deflector 97. The inner surface of the deflector 97 is reflective, as in the earlier examples.

The deflector 97 has the shape of a truncated cone, in this example, with a circular lateral cross section. The cone has two circular openings. The cone tapers from the large end opening to the narrow end opening, which is coupled to the active area 99 of the base 91. The narrow end of the deflector cone receives light from the surface 99 and thus from diffuse reflections between the base and the mask.

The entire area of the inner surface of the cone 97 is reflective. At least a portion of the reflective surface is specular, as in the deflectors of the earlier examples. The angle of the wall(s) of the conical deflector 97 substantially corresponds to the angle of the desired field of view of the illumination intended for the system 90. Because of the reflectivity of the wall of the cone 97, most if not all of the light reflected by the inner surface thereof would at least achieve an angle that keeps the light within the field of view.

The LED light sources 95 emit multiple wavelengths of light into the mask cavity 101. The light sources 95 may direct some light toward the inner surface of the deflector 97. Light rays impacting on the diffusely reflective surfaces, particularly those on the inner surface of the cavity 101 and the facing surface 99 of the base 91, reflect and diffuse one or more times within the confines of the system and emerge through the gap between the perimeter of the active area 99 of the base and the outer edge of the mask 93. The mask cavity 101 and the base surface 99 function as an integrating cavity with respect to the light of various wavelengths. The light emitted through the gap and/or reflected from the surface of the inner surface of the deflector 97 irradiates a region (upward in the illustrated orientation) with a desired intensity distribution and with a desired spectral characteristic, essentially as in the earlier examples.

Additional information regarding constructive occlusion based systems for generating and distributing radiant energy may be found in commonly assigned U.S. Pat. Nos. 6,342,695, 6,334,700, 6,286,979, 6,266,136 and 6,238,077. The color integration principles discussed herein may be adapted to any of the constructive occlusion devices discussed in those patents.

The inventive devices have numerous applications, and the output intensity and spectral characteristic may be tailored and/or adjusted to suit the particular application. For example, the intensity of the integrated radiant energy emitted through the aperture may be at a level for use in a rumination application or at a level sufficient for a task lighting application. A number of other control circuit features also may be implemented. For example, the control may maintain a set color characteristic in response to feedback from a color sensor. The control circuitry may also include a temperature sensor. In such an example, the logic circuitry is also responsive to the sensed temperature, e.g. to reduce intensity of the source outputs to compensate for temperature increases. The control circuitry may include an appropriate device for manually setting the desired spectral characteristic, for example, one or more variable resistors or one or more dip switches, to allow a user to define or select the desired color distribution.

Automatic controls also are envisioned. For example, the control circuitry may include a data interface coupled to the logic circuitry, for receiving data defining the desired color distribution. Such an interface would allow input of control data from a separate or even remote device, such as a personal computer, personal digital assistant or the like. A number of the devices, with such data interfaces, may be controlled from a common central location or device.

The control may be somewhat static, e.g. set the desired color reference index or desired color temperature and the overall intensity, and leave the device set-up in that manner for an indefinite period. The apparatus also may be controlled dynamically, for example, to provide special effects lighting. Where a number of the devices are arranged in a large two-dimensional array, dynamic control of color and intensity of each unit could even provide a video display capability, for example, for use as a "Jumbo-Tron" view screen in a stadium or the like.

To appreciate the features and examples of the control circuitry outlined above, it may be helpful to consider specific examples with reference to appropriate diagrams.

Figure 10:
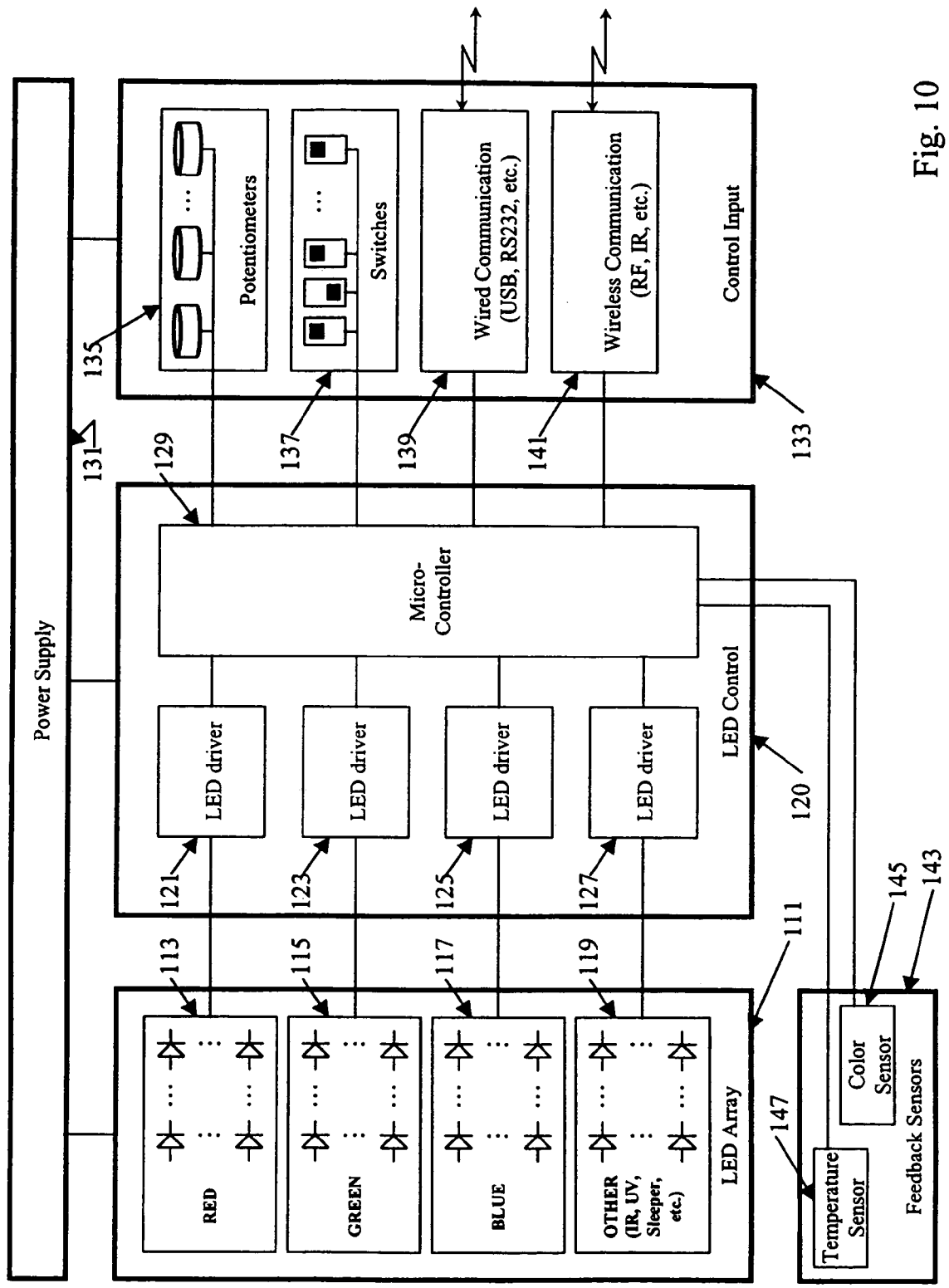

FIG. 10 is a block diagram of exemplary circuitry for the sources and associated control circuit, providing digital programmable control, which may be utilized with a light integrating fixture of the type described above. In this circuit example, the sources of radiant energy of the various wavelengths takes the form of an LED array 111. The array 111 comprises two or more LEDs of each of the three primary colors, red, green and blue, represented by LED blocks 113, 115 and 117. For example, the array may comprise six red LEDs 113, three green LEDs 115 and three blue LEDs 117.

The LED array in this example also includes a number of additional or "other" LEDs 119. There are two types of additional LEDs that are of particular interest in the present discussion. One type of additional LED provides one or more additional wavelengths of radiant energy for integration within the chamber. The additional wavelengths may be in the visible portion of the light spectrum, to allow a greater degree of color adjustment. Alternatively, the additional wavelength LEDs may provide energy in one or more wavelengths outside the visible spectrum, for example, in the infrared range or the ultraviolet range.

The second type of additional LED that may be included in the system is a sleeper LED. As discussed above, some LEDs would be active, whereas the sleepers would be inactive, at least during initial operation. Using the circuitry of FIG. 10 as an example, the Red LEDs 113, Green LEDs 115 and Blue LEDs 117 might normally be active. The LEDs 119 would be sleeper LEDs, typically including one or more LEDs of each color used in the particular system.

The electrical components shown in FIG. 10 also include an LED control system 120. The system 120 includes driver circuits for the various LEDs and a microcontroller. The driver circuits supply electrical current to the respective LEDs 113 to 119 to cause the LEDs to emit light. The driver circuit 121 drives the Red LEDs 113, the driver circuit 123 drives the green LEDs 115, and the driver circuit 125 drives the Blue LEDs 117. In a similar fashion, when active, the driver circuit 127 provides electrical current to the other LEDs 119. If the other LEDs provide another color of light, and are connected in series, there may be a single driver circuit 127. If the LEDs are sleepers, it may be desirable to provide a separate driver circuit 127 for each of the LEDs 119. The intensity of the emitted light of a given LED is proportional to the level of current supplied by the respective driver circuit.

The current output of each driver circuit is controlled by the higher level logic of the system. In this digital control example, that logic is implemented by a programmable microcontroller 129, although those skilled in the art will recognize that the logic could take other forms, such as discrete logic components, an application specific integrated circuit (ASIC), etc.

The LED driver circuits and the microcontroller 129 receive power from a power supply 131, which is connected to an appropriate power source (not separately shown). For most task-lighting applications, the power source will be an AC line current source, however, some applications may utilize DC power from a battery or the like. The power supply 129 converts the voltage and current from the source to the levels needed by the driver circuits 121-127 and the microcontroller 129.

A programmable microcontroller typically includes or has coupled thereto random-access memory (RAM) for storing data and read-only memory (ROM) and/or electrically erasable read only memory (EEROM) for storing control programming and any pre-defined operational parameters, such as pre-established light 'recipes.' The microcontroller 129 itself comprises registers and other components for implementing a central processing unit (CPU) and possibly an associated arithmetic logic unit. The CPU implements the program to process data in the desired manner and thereby generate desired control outputs.

The microcontroller 129 is programmed to control the LED driver circuits 121-127 to set the individual output intensities of the LEDs to desired levels, so that the combined light emitted from the aperture of the cavity has a desired spectral characteristic and a desired overall intensity. The microcontroller 129 may be programmed to essentially establish and maintain a desired 'recipe' or mixture of the available wavelengths provided by the LEDs used in the particular system. The microcontroller 129 receives control inputs specifying the particular 'recipe' or mixture, as will be discussed below. To insure that the desired mixture is maintained, the microcontroller receives a color feedback signal from an appropriate color sensor. The microcontroller may also be responsive to a feedback signal from a temperature sensor, for example, in or near the integrating cavity.

The electrical system will also include one or more control inputs 133 for inputting information instructing the microcontroller 129 as to the desired operational settings. A number of different types of inputs may be used and several alternatives are illustrated for convenience. A given installation may include a selected one or more of the illustrated control input mechanisms.

As one example, user inputs may take the form of a number of potentiometers 135. The number would typically correspond to the number of different light wavelengths provided by the particular LED array 111. The potentiometers 135 typically connect through one or more analog to digital conversion interfaces provided by the microcontroller 129 (or in associated circuitry). To set the parameters for the integrated light output, the user adjusts the potentiometers 135 to set the intensity for each color. The microcontroller 129 senses the input settings and controls the LED driver circuits accordingly, to set corresponding intensity levels for the LEDs providing the light of the various wavelengths.

Another user input implementation might utilize one or more dip switches 137. For example, there might be a series of such switches to input a code corresponding to one of a number of recipes. The memory used by the microcontroller 129 would store the necessary intensity levels for the different color LEDs in the array 111 for each recipe. Based on the input code, the microcontroller 129 retrieves the appropriate recipe from memory. Then, the microcontroller 129 controls the LED driver circuits 121-127 accordingly, to set corresponding intensity levels for the LEDs 113-119 providing the light of the various wavelengths.

As an alternative or in addition to the user input in the form of potentiometers 135 or dip switches 137, the microcontroller 129 may be responsive to control data supplied from a separate source or a remote source. For that purpose, some versions of the system will include one or more communication interfaces. One example of a general class of such interfaces is a wired interface 139. One type of wired interface typically enables communications to and/or from a personal computer or the like, typically within the premises in which the fixture operates. Examples of such local wired interfaces include USB, RS-232, and wire-type local area network (LAN) interfaces. Other wired interfaces, such as appropriate modems, might enable cable or telephone line communications with a remote computer, typically outside the premises. Other examples of data interfaces provide wireless communications, as represented by the interface 141 in the drawing. Wireless interfaces, for example, use radio frequency (RF) or infrared (IR) links. The wireless communications may be local on-premises communications, analogous to a wireless local area network (WLAN). Alternatively, the wireless communications may enable communication with a remote device outside the premises, using wireless links to a wide area network.

As noted above, the electrical components may also include one or more feedback sensors 143, to provide system performance measurements as feedback signals to the control logic, implemented in this example by the microcontroller 129. A variety of different sensors may be used, alone or in combination, for different applications. In the illustrated examples, the set 143 of feedback sensors includes a color sensor 145 and a temperature sensor 147. Although not shown, other sensors, such as an overall intensity sensor may be used. The sensors are positioned in or around the system to measure the appropriate physical condition, e.g. temperature, color, intensity, etc.

The color sensor 145, for example, is coupled to detect color distribution in the integrated radiant energy. The color sensor may be coupled to sense energy within the integrating cavity, within the deflector (if provided) or at a point in the field illuminated by the particular system. Various examples of appropriate color sensors are known. For example, the color sensor may be a digital compatible sensor, of the type sold by TAOS, Inc. Another suitable sensor might use the quadrant light detector disclosed in U.S. Pat. No. 5,877,490, with appropriate color separation on the various light detector elements (see U.S. Pat. No. 5,914,487 for discussion of the color analysis).

The associated logic circuitry, responsive to the detected color distribution, controls the output intensity of the various LEDs, so as to provide a desired color distribution in the integrated radiant energy, in accord with appropriate settings. In an example using sleeper LEDs, the logic circuitry is responsive to the detected color distribution to selectively activate the inactive light emitting diodes as needed, to maintain the desired color distribution in the integrated radiant energy. The color sensor measures the color of the integrated radiant energy produced by the system and provides a color measurement signal to the microcontroller 129. If using the TAOS, Inc. color sensor, for example, the signal is a digital signal derived from a color to frequency conversion.

The temperature sensor 147 may be a simple thermoelectric transducer with an associated analog to digital converter, or a variety of other temperature detectors may be used. The temperature sensor is positioned on or inside of the fixture, typically at a point that is near the LED sources that produce most of the system heat. The temperature sensor 147 provides a signal representing the measured temperature to the microcontroller 129. The system logic, here implemented by the microcontroller 129, can adjust intensity of one or more of the LEDs in response to the sensed temperature, e.g. to reduce intensity of the source outputs to compensate for temperature increases. The program of the microcontroller 129, however, would typically manipulate the intensities of the various LEDs so as to maintain the desired color balance between the various wavelengths of light used in the system, even though it may vary the overall intensity with temperature. For example, if temperature is increasing due to increased drive current to the active LEDs (with increased age or heat), the controller may deactivate one or more of those LEDs and activate a corresponding number of the sleepers, since the newly activated sleeper(s) will provide similar output in response to lower current and thus produce less heat.

Figure 11:
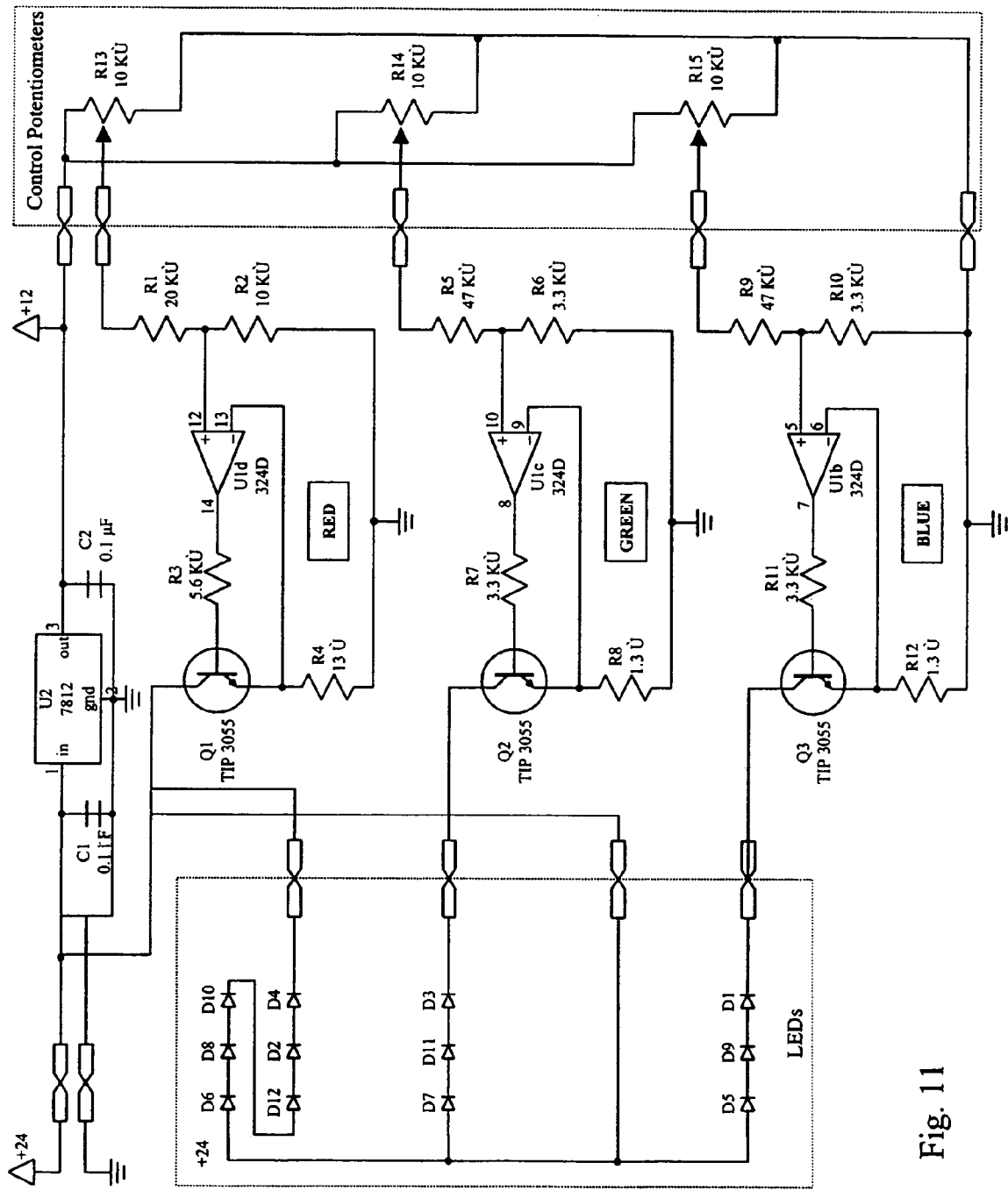
FIG. 11 is a functional block diagram of the electrical components, of one of the radiant energy emitting systems, using programmable digital control logic.

The above discussion of FIG. 10 related to programmed digital implementations of the control logic. Those skilled in the art will recognize that the control also may be implemented using analog circuitry. FIG. 11 is a circuit diagram of a simple analog control for a lighting apparatus (e.g. of the type shown in FIG. 1) using Red, Green and Blue LEDs. The user establishes the levels of intensity for each type of radiant energy emission (Red, Green or Blue) by operating a corresponding one of the potentiometers. The circuitry essentially comprises driver circuits for supplying adjustable power to two or three sets of LEDs (Red, Green and Blue) and analog logic circuitry for adjusting the output of each driver circuit in accord with the setting of a corresponding potentiometer. Additional potentiometers and associated circuits would be provided for additional colors of LEDs. Those skilled in the art should be able to implement the illustrated analog driver and control logic of FIG. 11 without further discussion.

Figure 12:
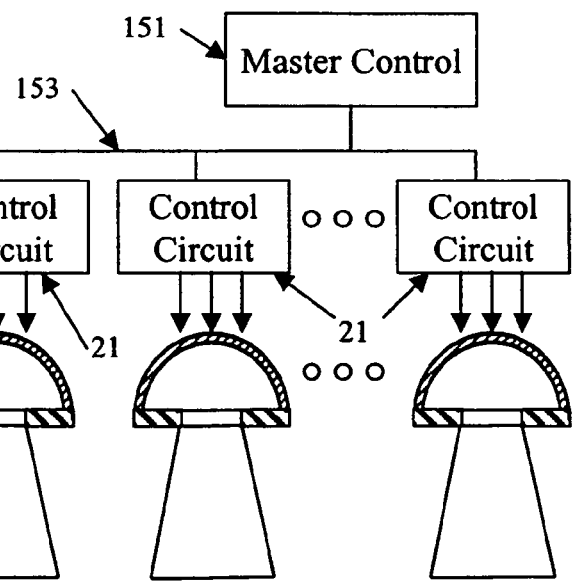
FIG. 12 is a diagram, illustrating a number of radiant energy emitting system with common control from a master control unit.

The systems described above have a wide range of applications, where there is a desire to set or adjust color provided by a lighting fixture. These include task lighting applications, signal light applications, as wells as applications for illuminating an object or person. Some lighting applications involve a common overall control strategy for a number of the systems. As noted in the discussion of FIG. 10, the control circuitry may include a communication interface 139 or 141 allowing the microcontroller 129 to communicate with another processing system. FIG. 12 illustrates an example in which control circuits 21 of a number of the radiant energy generation systems with the light integrating and distribution type fixture communicate with a master control unit 151 via a communication network 153. The master control unit 151 typically is a programmable computer with an appropriate user interface, such as a personal computer or the like. The communication network 153 may be a LAN or a wide area network, of any desired type. The communications allow an operator to control the color and output intensity of all of the linked systems, for example to provide combined lighting effects.

Figure 13:
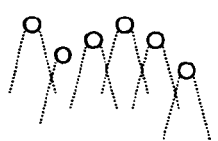
FIG. 13 is a layout diagram, useful in explaining an arrangement of a number of the fixtures of the system of FIG. 12.

The commonly controlled lighting systems may be arranged in a variety of different ways, depending on the intended use of the systems. FIG. 13 for example, shows a somewhat random arrangement of lighting systems. The circles represent the output openings of those systems, such as the large opening of the system deflectors. The dotted lines represent the fields of the emitted radiant energy. Such an arrangement of lighting systems might be used to throw desired lighting on a wall or other object and may allow the user to produce special lighting effects at different times. Another application might involve providing different color lighting for different speakers during a television program, for example, on a news program, panel discussion or talk show.

Figure 14:
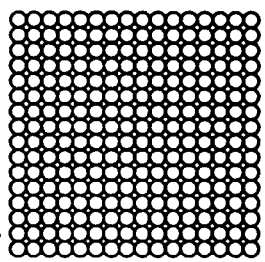
FIG. 14 depicts the emission openings of a number of the fixtures, arranged in a two-dimensional array.

The commonly controlled radiant energy emission systems also may be arranged in a two-dimensional array or matrix. FIG. 14 shows an example of such an array. Again, circles represent the output openings of those systems. In this example of an array, the outputs are tightly packed. Each output may serve as a color pixel of a large display system. Dynamic control of the outputs therefore can provide a video display screen, of the type used as "Jumbo-Trons" in stadiums or the like.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A system comprising:
   A) a light fixture for a visible illuminating type lighting application, to illuminate or to provide task or object illumination, in a region or area intended to be occupied by a person, the light fixture comprising:
      1) an optical integrating cavity having at least one diffusely reflective interior surface and an optical passage through a wall of the cavity for allowing emission of optically integrated light from the cavity; and
      2) a plurality of sources of light coupled to directly supply light to the optical integrating cavity in one or more directions to cause substantial portions of light supplied by the sources to reflect from said at least one diffusely reflective surface of the optical integrating cavity one or more times to optically integrate the light from the sources before emission as the optically integrated light through the optical passage of the integrating cavity for the visible lighting application, at least two of the sources emitting light of respective different colors,
      wherein the sources provide sufficient light energy in the optically integrated light and the optical integrating cavity is configured to direct the optically integrated light emitted through the optical passage in a direction to facilitate said visible illuminating type lighting application; and
   B) a control circuit coupled to the sources for establishing output intensity of light of each of the sources to set contributions of the different colors to the optically integrated light within the cavity and thus set a spectral characteristic of the optically integrated light emitted through the optical passage of the optical integrating cavity.

2. The system of claim 1, wherein the fixture is configured as a downlight.

3. The system of claim 2, wherein the sources provide sufficient light energy for the optically integrated light emitted through the optical passage to have a level sufficient for a task lighting application.

4. The system of claim 1, further comprising:
   a user input device coupled to the control circuit, for receiving a user input relating to a desired spectral characteristic;
   wherein the control circuit sets the spectral characteristic of the optically integrated light responsive to the user input relating to the desired spectral characteristic.

5. The system of claim 4, wherein:
   the plurality of sources comprises one or more light emitting diodes for emitting light of a first color, one or more light emitting diodes for emitting light of a second color, and one or more light emitting diodes for emitting light of a third color; and
   the first, second and third colors are different colors.

6. The system of claim 1, wherein all interior surfaces of the optical integrating cavity are white and are highly diffusely reflective at least with respect to light of colors emitted by the sources.

7. The system of claim 6, wherein one or more of the interior surfaces of the optical integrating cavity exhibits a reflectivity over 90%.

8. The system of claim 7 wherein all interior surfaces of the optical integrating cavity exhibit a reflectivity of at least 98%.

9. The system of claim 1, wherein:
   the fixture comprises a dome and a plate
   an interior surface of the dome and an interior surface of the plate form the optical integrating cavity; and
   the interior surface of the dome is diffusely reflective so as to form the at least one diffusely reflective interior surface and an optical passage.

10. The system of claim 9, wherein the interior surface of the plate is diffusely reflective.

11. The system of claim 9, wherein the optical passage is through the plate.

12. The system of claim 9, wherein the interior surface of the dome has a shape corresponding to a substantial portion of a sphere.

13. The system of claim 9, wherein the interior surface of the dome has a shape corresponding to a substantial portion of a cylinder.

14. The system of claim 1, wherein the optical passage comprises an optical aperture through the wall of the cavity.

15. The system of claim 14, wherein light from the sources enters the optical integrating cavity at points on an interior surface of the optical integrating cavity not directly visible through the aperture.

16. The system of claim 15, wherein:
    the optical integrating cavity has a plurality of openings at the points on the interior surface of the cavity, and
    the plurality of sources are positioned to emit light into the interior of the integrating cavity through respective ones of the openings.

17. The system of claim 1, further comprising a deflector having a reflective inner surface coupled to the optical passage to deflect at least some of the optically integrated light emitted through the optical passage and define a field of illumination for the emitted light with respect to the lighting application.

18. The system of claim 1, further comprising:
    a sensor responsive to optically integrated light,
    wherein the control circuit maintains the spectral characteristic of the optically integrated light responsive to an output from the sensor.

19. The system of claim 18, wherein the sensor comprises a color sensor for sensing a color characteristic of the optically integrated light in the optical integrating cavity.

20. The system of claim 18, wherein the sensor comprises a light intensity sensor for sensing intensity of light in the optical integrating cavity.

21. A system comprising:
    A) a light fixture for a visible illuminating type lighting application, to illuminate or to provide task or object illumination, in a region or area intended to be occupied by a person, the light fixture comprising:
       1) one or more first light emitting diodes for emitting light of a first humanly visible color;
       2) one or more second light emitting diodes for emitting light of a second humanly visible color, the second color being different from the first color; and
       3) an optical integrating cavity, wherein:
          i) the optical integrating cavity comprises at least one interior surface having a diffuse reflectivity with respect to visible light of the first and second colors, and an optical passage through a wall of the optical integrating cavity; and
          ii) the first and second light emitting diodes are coupled to directly supply light to the optical integrating cavity in one or more directions to cause substantial portions of light supplied by the light emitting diodes to reflect one or more times from said at least one diffusely reflective surface of the optical integrating cavity so as to integrate substantial portions of the light from the light emitting diodes before emission as optically integrated light through the optical passage, iii) the first and second light emitting diodes provide sufficient light energy in the optically integrated light and the optical integrating cavity is configured to direct the optically integrated light emitted through the optical passage in a direction to facilitate said visible illuminating type lighting application; and B) a control circuit, responsive to a user input relating to a desired spectral characteristic, coupled to the first and second light emitting diodes for establishing output intensity of light of each of the first and second light emitting diodes to set contributions of the different colors to the optically integrated light within the cavity and thus set a spectral characteristic of the optically integrated light emitted through the optical passage responsive to the user input.

22. The system of claim 21, wherein the at least one interior surface of the optical integrating cavity is white and is highly diffusely reflective, at least with respect to light of first and second colors.

23. The system of claim 22, wherein the at least one interior surface of the optical integrating cavity exhibits a reflectivity over 90%.

24. The system of claim 23, wherein the at least one interior surface of the optical integrating cavity exhibits a reflectivity of at least 98%.

25. The system of claim 21, further comprising one or more third light emitting diodes for emitting light of a third humanly visible color coupled to supply the light of the third color for diffuse reflection within the optical integrating cavity to optically integrate the light of the third color with light of the first and second colors to form the optically integrated light for emission through the optical passage.

26. The system of claim 21, wherein the at least one interior surface of the optical integrating cavity has a shape corresponding to a substantial portion of a sphere.

27. The system of claim 21, wherein the at least one interior surface of the optical integrating cavity has a shape corresponding to a substantial portion of a cylinder.

28. The system of claim 21, further comprising a deflector having a reflective inner surface coupled to the optical passage to deflect at least some of the optically integrated light emitted through the optical passage and define a field of illumination for the emitted light with respect to the lighting application.

29. The system of claim 21, further comprising:
a sensor responsive to optically integrated light,
wherein the control circuit maintains the spectral characteristic of the optically integrated light responsive to an output from the sensor.

30. The system of claim 29, wherein the sensor comprises a color sensor for sensing a color characteristic of the optically integrated light in the optical integrating cavity.

31. The system of claim 29, wherein the sensor comprises a light intensity sensor for sensing intensity of light in the optical integrating cavity.

32. The system of claim 21, wherein the fixture is configured as a downlight.

33. The system of claim 32, wherein the first and second light emitting diodes provide sufficient light energy for the optically integrated light emitted through the optical passage to have a level sufficient for a task lighting application.

34. A system comprising:
A) a light fixture for a visible illuminating type lighting application, to illuminate or to provide task or object illumination, in a region or area intended to be occupied by a person, the light fixture comprising:
1) one or more first light emitting diodes for emitting humanly visible light of a first spectral characteristic;
2) one or more second light emitting diodes for emitting humanly visible light of a second spectral characteristic, the second spectral characteristic being different from the spectral characteristic; and
3) an optical integrating cavity, wherein:
i) the optical integrating cavity comprises at least one interior surface having a diffuse reflectivity with respect to light emitted by the light emitting diodes, and an optical passage through a wall of the optical integrating cavity; and
ii) the first and second light emitting diodes are coupled to directly supply light to the optical integrating cavity in one or more directions to cause substantial portions of light supplied by the light emitting diodes to reflect one or more times from said at least one diffusely reflective surface of the optical integrating cavity to optically integrate the portions of the light from the light emitting diodes before emission as optically integrated light through the optical passage,
iii) the first and second light emitting diodes provide sufficient light energy in the optically integrated light and the optical integrating cavity is configured to direct the optically integrated light emitted through the optical passage in a direction to facilitate said visible illuminating type lighting application; and B) a control circuit, responsive to a user input relating to a desired spectral characteristic, coupled to the first and second light emitting diodes for establishing output intensity of light of each of the first and second light emitting diodes to set contributions of the lights of the different spectral characteristics to the optically integrated light within the cavity and thus set a spectral characteristic of the optically integrated light emitted through the optical passage responsive to the user input.

35. The system of claim 34, further comprising:
a sensor responsive to integrated light,
wherein the control circuit maintains the spectral characteristic of the optically integrated light responsive to an output from the sensor.

36. The system of claim 35, wherein the sensor comprises a color sensor for sensing a color characteristic of the optically integrated light in the optical integrating cavity.

37. The system of claim 35, wherein the sensor comprises a light intensity sensor for sensing intensity of light in the optical integrating cavity.

38. The system of claim 34, wherein the fixture is configured as a downlight.

39. The system of claim 38, wherein the first and second light emitting diodes provide sufficient light energy for the optically integrated light emitted through the optical passage to have a level sufficient for a task lighting application.

* * * * *